United States Patent
Kudo

(10) Patent No.: US 8,149,477 B2
(45) Date of Patent: Apr. 3, 2012

(54) OPTICAL SCANNING APPARATUS AND IMAGE FORMING APPARATUS INCLUDING THE SAME

(75) Inventor: Genichiro Kudo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 520 days.

(21) Appl. No.: 12/429,062

(22) Filed: Apr. 23, 2009

(65) Prior Publication Data
US 2009/0268266 A1    Oct. 29, 2009

(30) Foreign Application Priority Data
Apr. 25, 2008    (JP) .................. 2008-115731

(51) Int. Cl.
*H04N 1/04* (2006.01)
(52) U.S. Cl. ........ 358/475; 358/509; 358/481; 359/566; 359/219; 347/235; 347/233; 399/177; 399/200
(58) Field of Classification Search .................. 358/474, 358/481, 475, 509, 1.7; 359/566, 207.7, 359/201.2, 204, 205, 216, 218, 219, 207, 359/208; 347/235, 232, 233, 243; 399/177, 399/200
See application file for complete search history.

(56) References Cited

U.S. PATENT DOCUMENTS

| | | | | |
|---|---|---|---|---|
| 5,481,384 A * | 1/1996 | Kramer et al. | ................... | 359/17 |
| 6,188,419 B1 * | 2/2001 | Katamoto et al. | ............ | 347/129 |
| 6,249,387 B1 * | 6/2001 | Poradish et al. | ............... | 359/634 |
| 6,347,003 B1 * | 2/2002 | Shiraishi et al. | ........... | 359/204.1 |
| 6,552,835 B2 * | 4/2003 | Huang | ........................ | 359/201.2 |
| 6,814,442 B2 * | 11/2004 | Okuyama et al. | ................ | 353/20 |
| 6,839,076 B2 * | 1/2005 | Yamaguchi | ................... | 347/235 |
| 6,847,473 B2 * | 1/2005 | Inagaki | ........................ | 359/205.1 |
| 6,956,597 B2 * | 10/2005 | Bush et al. | ..................... | 347/243 |
| 6,992,689 B2 * | 1/2006 | Yamaguchi | ................... | 347/235 |
| 7,310,174 B2 * | 12/2007 | Wine et al. | ................. | 359/201.1 |
| 7,436,562 B2 * | 10/2008 | Nagasawa et al. | ......... | 359/196.1 |
| 2007/0132728 A1 * | 6/2007 | Lin et al. | ....................... | 345/157 |

FOREIGN PATENT DOCUMENTS
JP    2003-287695 A    10/2003
* cited by examiner

*Primary Examiner* — Negussie Worku
(74) *Attorney, Agent, or Firm* — Canon USA, Inc., I.P. Division

(57) ABSTRACT

In an optical scanning apparatus, the shape of a sub-scanning section of a transmissive imaging optical element on which a light beam subjected to scanning and deflected by a deflecting surface of an optical deflector is incident twice, the tilt angle of a reflective optical element disposed in an optical path between the optical deflector and a surface to be scanned, and the relationship between the transmissive imaging optical element and the reflective optical element are provided.

9 Claims, 15 Drawing Sheets

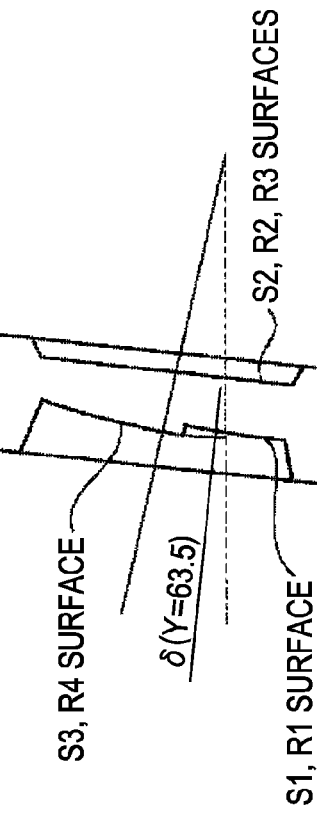
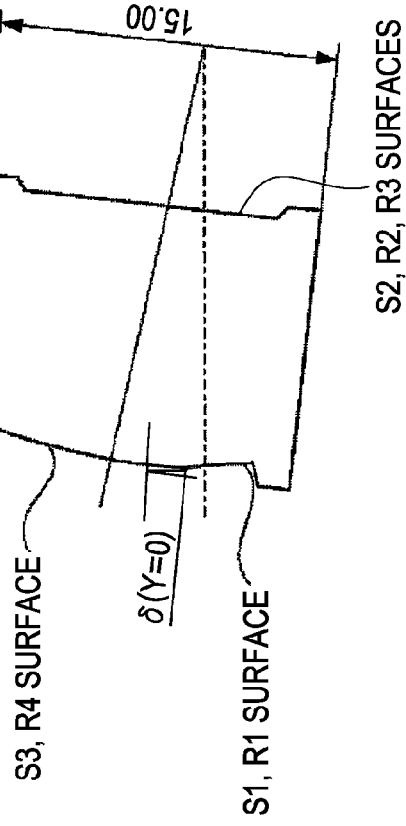
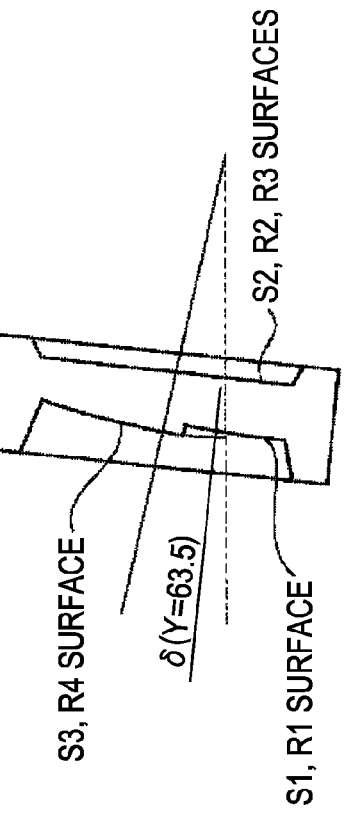
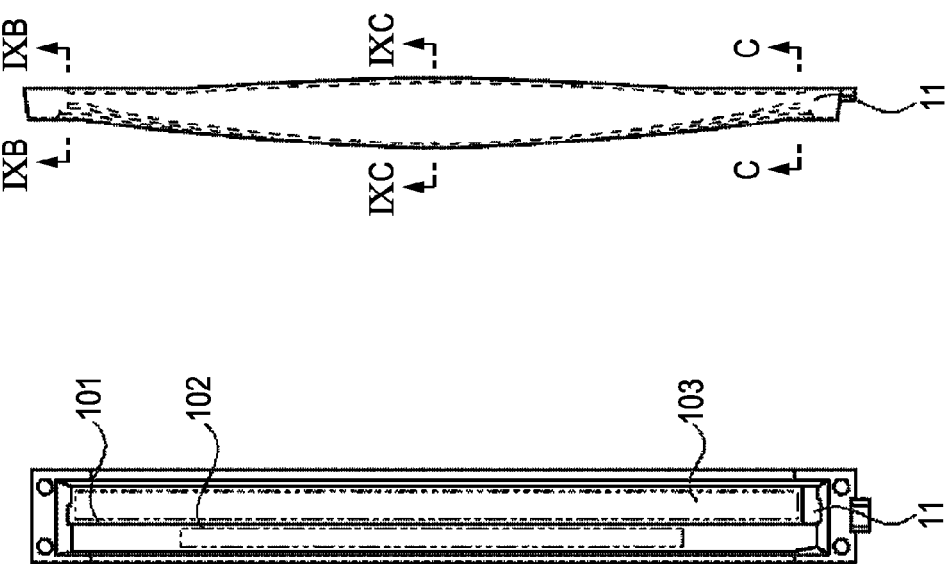

OPTICAL SCANNING APPARATUS AND IMAGE FORMING APPARATUS INCLUDING THE SAME

BACKGROUND OF THE INVENTION

1. Field of the Invention

The present invention relates to an optical scanning apparatus and an image forming apparatus and is suited for an image forming apparatus that uses an electrophotographic process, such as a laser beam printer (LBP), a digital copier, or a multifunction printer.

2. Description of the Related Art

Typical LBPs, digital copiers, and multifunction printers use an optical scanning apparatus.

The optical scanning apparatus periodically deflects a pencil of rays (light beam) being modulated in response to an image signal and emitted from a light emitting unit using a optical deflector including a rotatable polygonal mirror.

The optical scanning apparatus causes a deflected light beam to converge on a surface of a photo conductor in the form of a spot using an imaging optical system having fθ characteristics and records an image by scanning the surface.

There are various optical scanning apparatuses that include an imaging optical system having a single imaging lens with the aim of reducing its size (see, for example, Par. 21 and FIGS. 1 and 16 of Japanese Patent Laid-Open No. 2003-287695, corresponding to 1.66 of col. 5 through 1.16 of col. 6 U.S. Pat. No. 6,847,473)

This patent document discloses an optical scanning apparatus that includes an imaging optical system having a free-form transmitting surface and a free-form reflecting surface, that reflects a light beam passing through the transmitting surface after being emitted from an optical deflector at the reflecting surface, and that causes the reflected light beam to re-pass through the transmitting surface.

The optical scanning apparatus described in the above patent document causes a light beam to obliquely enter the deflecting surface of the optical deflector within a sub-scanning section. Thus, there is a problem in that pitch unevenness occurs in the sub-scanning direction because of a shift decentering error of the deflecting surface.

When projecting a light beam within a sub-scanning section, the optical scanning apparatus described in the above patent document causes the light beam to enter the deflecting surface of the optical deflector from an oblique direction with respect to the normal to the deflecting surface (or with respect to the optical axis of the imaging optical system). Accordingly, it is necessary to enhance machining precision of the optical deflector.

In addition, because the optical scanning apparatus described in the above patent document defines a power of the transmitting surface and a power of the reflecting surface in order to separate a light beam that first passes through the transmitting surface and a light beam that re-passes through the transmitting surface from one another in a sub-scanning section and in order to mitigate curvature of field at the photo conductor in a sub-scanning direction and have a constant magnification in the sub-scanning direction, a problem still remains in that a reduction in thickness of the optical scanning apparatus is not achieved.

SUMMARY OF THE INVENTION

The present invention provides an optical scanning apparatus that has a small thickness and that is capable of separating a light beam that first passes through a transmitting surface and a light beam that re-passes through the transmitting surface from one another in a sub-scanning section.

According to an aspect of the present invention, an optical scanning apparatus includes a light emitting unit, a deflecting unit having a deflecting surface, an incidence optical system configured to cause a light beam emitted from the light emitting unit incident on the deflecting unit, an imaging optical system, and a reflective optical element. The imaging optical system includes a transmissive imaging optical element that forms an image of a light beam on a surface to be scanned, the light beam being subjected to scanning and deflected by the deflecting surface of the deflecting unit. The transmissive imaging optical element has a first transmitting surface, a second transmitting surface, a third transmitting surface, and a fourth transmitting surface. The reflective optical element is disposed in an optical path between the deflecting unit and the transmissive imaging optical element. The reflective optical element has a reflecting surface. After the light beam subjected to scanning and deflected by the deflecting surface of the deflecting unit passes through the transmissive imaging optical element in order of the first transmitting surface and the second transmitting surface and then reflected at the reflecting surface of the reflective optical element, the light beam re-passes through the transmissive imaging optical element in order of the third transmitting surface and the fourth transmitting surface.

The following condition is satisfied:

$$L2 \times \tan(2\alpha) > (w1+w2)/2$$

$$0 < \alpha < 20$$

where $L2$ is a length in millimeters of an optical path from the first transmitting surface to the reflecting surface, $\alpha$ is an angle in degrees between a normal to the reflecting surface and a normal to the deflecting surface in a sub-scanning section, $w1$ is a width in millimeters of the light beam in a sub-scanning direction at the first transmitting surface, and $w2$ is a width in millimeters of the light beam in the sub-scanning direction at the fourth transmitting surface.

With the configuration of the present invention, advantages of separating a light beam that first passes through a transmitting surface and a light beam that re-passes through the transmitting surface and having a small thickness in an optical scanning apparatus.

Further features of the present invention will become apparent from the following description of exemplary embodiments and from the attached drawings.

BRIEF DESCRIPTION OF THE DRAWINGS

FIGS. 9A to 9C illustrate the imaging lens according to the first embodiment, and FIG. 9D illustrates an effective area according to the first embodiment.

DESCRIPTION OF THE EMBODIMENTS

In embodiments of the present invention described below, an imaging optical system is described both in terms of an absolute coordinate system and a relative coordinate system. The origin and direction cosines of the relative coordinate system are given relative to the absolute coordinate system.

The absolute coordinate system is described below.

The origin of the absolute coordinate system is the point of intersection of a perpendicular bisector of a surface to be scanned and an optical axis of an incident optical system on a deflecting surface of a deflecting unit.

Figure 1:
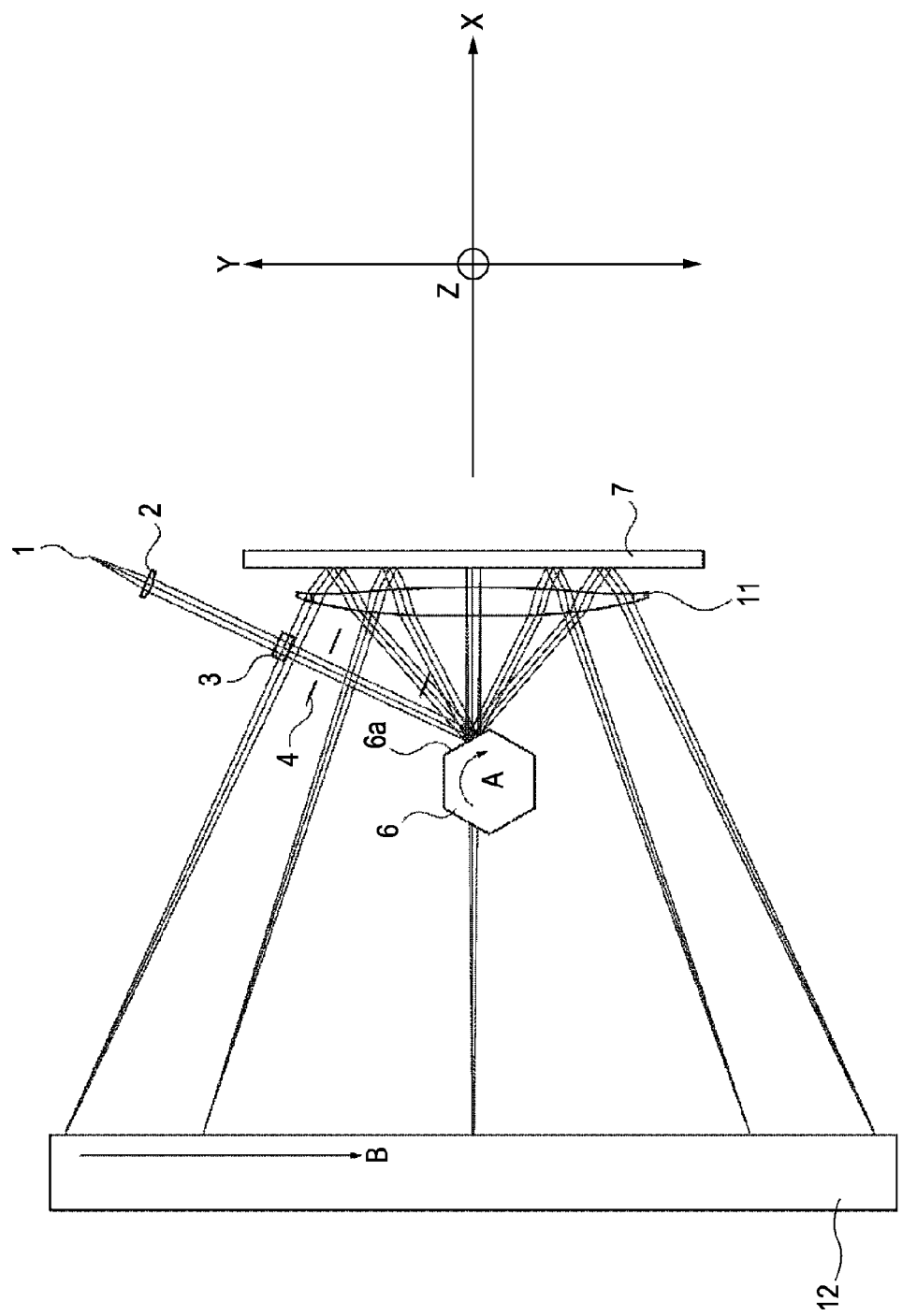
FIG. 1 illustrates a main-scanning section according to a first embodiment of the present invention.
Figure 2:
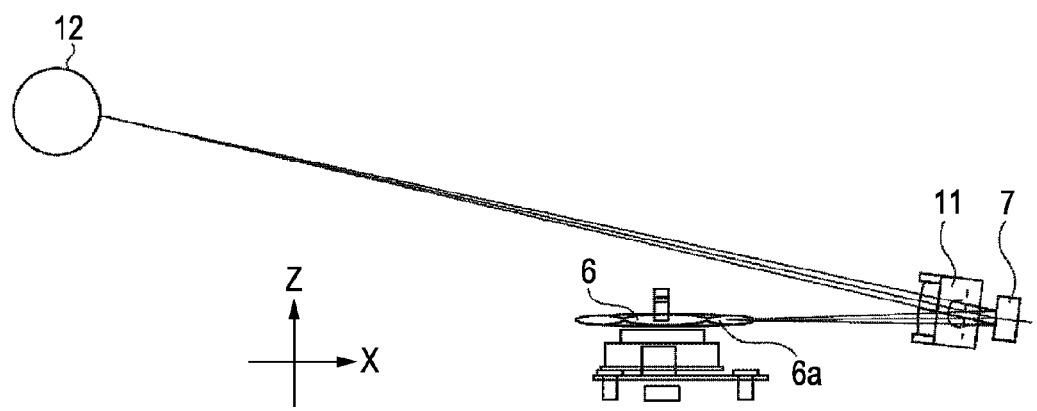
FIG. 2 illustrates a sub-scanning section according to the first embodiment.

In other words, the origin of the absolute coordinate system is the position where a principal ray of a light beam that is to reach the center of scanning of a surface 12 to be scanned after being subjected to scanning and deflected by a deflecting surface 6a of an optical deflector 6 illustrated in FIGS. 1 and 2 is deflected and reflected at the deflecting surface 6a of the optical deflector 6.

The main scanning direction (Y direction) in the absolute coordinate system is a direction in which a light beam is subjected to scanning and deflected by the deflecting surface of the deflecting unit.

The sub-scanning direction (Z direction) in the absolute coordinate system is a direction parallel to the rotation shaft of the deflecting unit.

The optical axis (X direction) of an imaging optical system in the absolute coordinate system is a direction perpendicular to the main scanning direction (Y direction) and the sub-scanning direction (Z direction).

The main-scanning section in the absolute coordinate system is a section whose normal is the sub-scanning direction (Z direction).

The sub-scanning section in the absolute coordinate system is a section that includes a normal of an optical surface of an imaging optical element included in the imaging optical system and that is perpendicular to the main-scanning section.

The relative coordinate system is described below.

Figure 4:
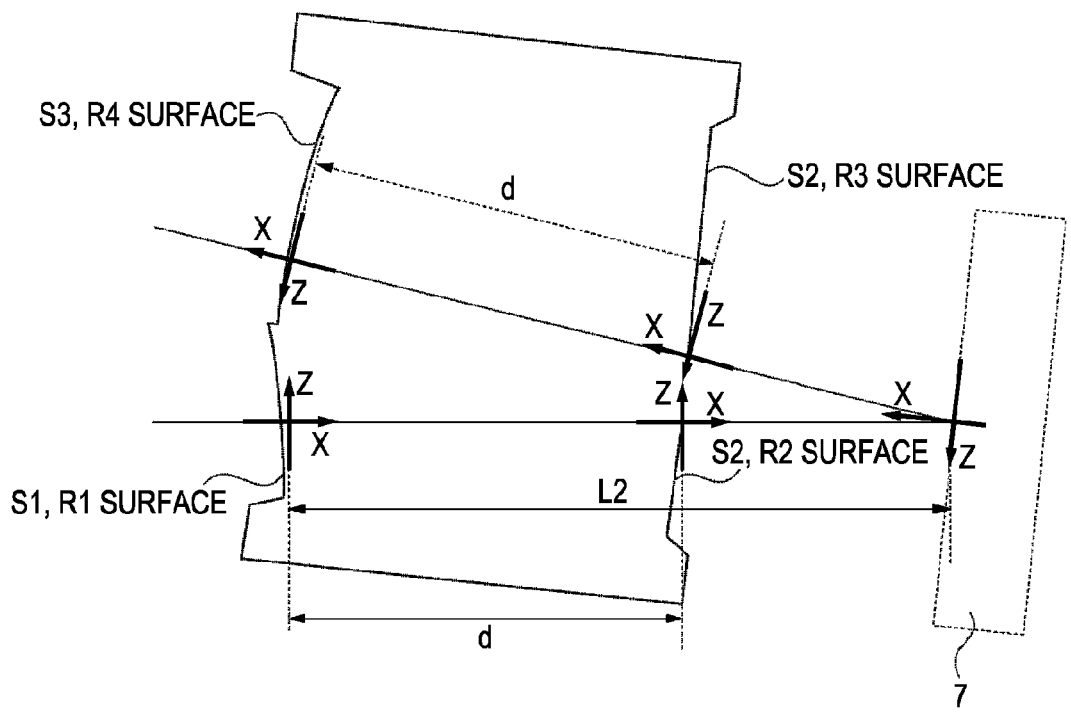
FIG. 4 illustrates a coordinate system of surface vertices according to the first embodiment.

A first transmitting surface R1 (S1), a second transmitting surface R2 (S2), a third transmitting surface R3 (S2), a fourth transmitting surface R4 (S3), and a planar reflector 7 illustrated in FIG. 4 are each described in a respective relative coordinate system illustrated in Table 2 (a local coordinate system of each surface viewed from the absolute coordinate system).

The arrow for each surface illustrated in FIG. 4 schematically represents the coordinate system.

First, the relative coordinate system for the first transmitting surface R1 (S1) is described.

The origin of the first transmitting surface R1 (S1) is positioned at (X, Y, Z)=(45, 0, 0) in the absolute coordinate system, as illustrated in Table 2, and the direction cosine of the x-axis is (gx, gy, gz)=(1, 0, 0).

The direction cosine of the x-axis in the relative coordinate system for the first transmitting surface R1 (S1) is the optical axis (X direction) for the first transmitting surface R1 (S1).

The optical axis (X direction) for the first transmitting surface R1 (S1) is the same as the optical axis (X direction) of the imaging optical system in the absolute coordinate system.

The direction of the y-axis in the relative coordinate system for the first transmitting surface R1 (S1) is the same as the main scanning direction (Y direction) in the absolute coordinate system.

The direction of the y-axis in the relative coordinate system for the first transmitting surface R1 (S1) is the main scanning direction (Y direction) for the first transmitting surface R1 (S1).

The direction perpendicular to the direction cosine of the x-axis in the relative coordinate system for the first transmitting surface R1 (S1) and the y-axis in the relative coordinate system for the first transmitting surface R1 (S1) is the z-axis.

The direction of the z-axis in the relative coordinate system for the first transmitting surface R1 (S1) is the sub-scanning direction (Z direction) for the first transmitting surface R1 (S1).

The direction of the z-axis in the relative coordinate system for the first transmitting surface R1 (S1) is the same as the sub-scanning direction (Z direction) in the absolute coordinate system.

Next, the relative coordinate system for the second transmitting surface R2 (S2) is described.

The origin of the second transmitting surface R2 (S2) is positioned at (X, Y, Z)=(56, 0, 0) in the absolute coordinate system, as illustrated in Table 2, and the direction cosine of the x-axis is (gx, gy, gz)=(0.99357, 0, −0.11320).

The direction cosine of the x-axis in the relative coordinate system for the second transmitting surface R2 (S2) is the optical axis (X direction) for the second transmitting surface R2 (S2).

The direction of the y-axis in the relative coordinate system for the second transmitting surface R2 (S2) is the same as the main scanning direction (Y direction) in the absolute coordinate system.

The direction of the y-axis in the relative coordinate system for the second transmitting surface R2 (S2) is the main scanning direction (Y direction) for the second transmitting surface R2 (S2).

The direction perpendicular to the direction cosine of the x-axis in the relative coordinate system for the second transmitting surface R2 (S2) and the y-axis in the relative coordinate system for the second transmitting surface R2 (S2) is the z-axis.

The direction of the z-axis in the relative coordinate system for the second transmitting surface R2 (S2) is the sub-scanning direction (Z direction) for the second transmitting surface R2 (S2).

The origin of the third transmitting surface R3 (S2) is positioned at (X, Y, Z)=(56.1922, 0, 1.6871) in the absolute coordinate system, as illustrated in Table 2, and the direction cosine of the x-axis is (gx, gy, gz)=(−0.99357, 0, 0.11320). The direction cosine of the x-axis in the relative coordinate system for the third transmitting surface R3 (S2) is the optical axis (X direction) for the third transmitting surface R3 (S2).

The direction of the y-axis in the relative coordinate system for the third transmitting surface R3 (S2) is the same as the main scanning direction (Y direction) in the absolute coordinate system.

The direction of the y-axis in the relative coordinate system for the third transmitting surface R3 (S2) is the main scanning direction (Y direction) for the third transmitting surface R3 (S2).

The direction perpendicular to the direction cosine of the x-axis in the relative coordinate system for the third transmitting surface R3 (S2) and the y-axis in the relative coordinate system for the third transmitting surface R3 (S2) is the z-axis.

The direction of the z-axis in the relative coordinate system for the third transmitting surface R3 (S2) is the sub-scanning direction (Z direction) for the third transmitting surface R3 (S2).

The S2 surface forming the second transmitting surface R2 and the third transmitting surface R3 has a planer shape in the relative coordinate system for the R2 surface.

Next, the relative coordinate system for the fourth transmitting surface R4 (S3) is described.

For example, the origin of the fourth transmitting surface R4 (S3) is positioned at (X, Y, Z)=(45.0844, 0, 4.2516) in the absolute coordinate system, as illustrated in Table 2, and the direction cosine of the x-axis is (gx, gy, gz)=(−0.97437, 0, 0.22495). The direction cosine of the x-axis in the relative coordinate system for the fourth transmitting surface R4 (S3) is the optical axis (X direction) for the fourth transmitting surface R4 (S3).

The direction of the y-axis in the relative coordinate system for the fourth transmitting surface R4 (S3) is the same as the main scanning direction (Y direction) in the absolute coordinate system.

The direction of the y-axis in the relative coordinate system for the fourth transmitting surface R4 (S3) is the main scanning direction (Y direction) for the fourth transmitting surface R4 (S3).

The direction perpendicular to the direction cosine of the x-axis in the relative coordinate system for the fourth transmitting surface R4 (S3) and the y-axis in the relative coordinate system for the fourth transmitting surface R4 (S3) is the z-axis.

The direction of the z-axis in the relative coordinate system for the fourth transmitting surface R4 (S3) is the sub-scanning direction (Z direction) for the fourth transmitting surface R4 (S3).

In the embodiments, an effective area indicates a region through which a light beam used for image formation passes.

FIG. 1 illustrates a main-scanning section (illustrates a main portion of a section in the main scanning direction) according to a first embodiment of the present invention.

FIG. 2 illustrates a sub-scanning section (illustrates a main portion of a section in the sub-scanning direction).

Reference numerals illustrated in FIGS. 1 and 2 are described below. A light emitting unit 1 can be composed of a semiconductor laser. A collimator lens 2 converts a light beam emitted from the light emitting unit 1 in both the main-scanning section and the sub-scanning section into a parallel light beam. A cylindrical lens 3 has a predetermined refractive power (hereinafter sometimes referred to simply as "power") in the sub-scanning direction and zero power in the main scanning direction. An aperture stop 4 is an oval opening that is long in the main scanning direction. Each of the collimator lens 2 and the cylindrical lens 3 forms an element of the incident optical system. An optical deflector 6 serves as a deflecting unit and can be composed of, for example, a rotatable polygonal mirror. The optical deflector 6 is rotated by a driving unit (not shown), such as a motor, in the direction of the arrow A (FIG. 1) at a constant speed.

In the present embodiment, a rotatable polygonal mirror having six surfaces is used.

An imaging lens 11 has fθ characteristics and has the function of compensating for a face tangle of the optical deflector by making the deflecting surface 6a of the optical deflector 6 and the photo-conductive surface 12 serving as the surface to be scanned be in a conjugate relationship in the sub-scanning section.

In the present embodiment, the imaging lens 11 serving as a single transmissive imaging optical element constitutes the imaging optical system.

The planar reflector 7 serves as a reflective optical element. The planar reflector 7 reflects a light beam that passed through the imaging lens 11 such that light beam is reflected at an angle with respect to the sub-scanning direction so as to re-enter the imaging lens 11.

The planar reflector 7 is disposed in an optical path between the deflecting surface 6a of the optical deflector 6 and the surface of the photo-conductive surface 12 serving as the surface to be scanned.

The planar reflector 7 has the function for reducing the size and thickness of the optical scanning apparatus and the function of making a light beam that passed through the imaging lens 11 re-enter the imaging lens 11 and favorably maintaining the optical performance.

The photo-conductive surface 12 serves as the surface to be scanned. On the photo-conductive surface 12, a light beam subjected to scanning and deflected by the deflecting surface of the optical deflector forms a spot at a uniform speed.

In the present embodiment, a light beam modulated according to image information is emitted from the light emitting unit 1, is converted by the collimator lens 2 into a parallel light beam, and enters the cylindrical lens 3.

The modulated light beam emitted from the light emitting unit 1 is converted by the collimator lens 2 into a parallel light beam in both the main-scanning section and the sub-scanning section.

The light beam that passed through the cylindrical lens 3 is shaped by the aperture stop 4 so as to have a predetermined beam diameter in both the main scanning direction and the sub-scanning direction and is emitted.

The light beam that passed through the cylindrical lens 3, which has a power in the sub-scanning direction and zero power in the main scanning direction, converges in only the sub-scanning direction and forms a line image that is long in the main scanning direction onto the deflecting surface 6a of the optical deflector 6.

The light beam is incident on the deflecting surface 6a of the optical deflector 6 from an oblique direction with respect to the optical axis of the first transmitting surface S1 (R1 surface) in the main-scanning section.

In the present embodiment, when the light beam incident on the deflecting surface 6a of the optical deflector 6 is projected in a sub-scanning section containing the optical axis of the imaging lens 11, the angle between the light beam incident on the deflecting surface 6a of the optical deflector 6 and the optical axis of the imaging lens 11 is zero.

An image of the light beam subjected to scanning and deflected by the deflecting surface 6a of the optical deflector 6 is formed on the photo-conductive surface 12 by the imaging lens 11 so as to have a spot shape.

The rotation of the optical deflector 6 in the direction of the arrow A enables scanning in the direction of the arrow B (in the main scanning direction) on the photo-conductive surface 12 at a uniform speed.

In such a way, an image is recorded on the photo-conductive surface 12, which is a storage medium.

The imaging lens 11 in the present embodiment is made of a resin material and is composed of a single transmissive imaging optical element having three refractive surfaces (S1, S2, and S3 surfaces).

Figure 3:
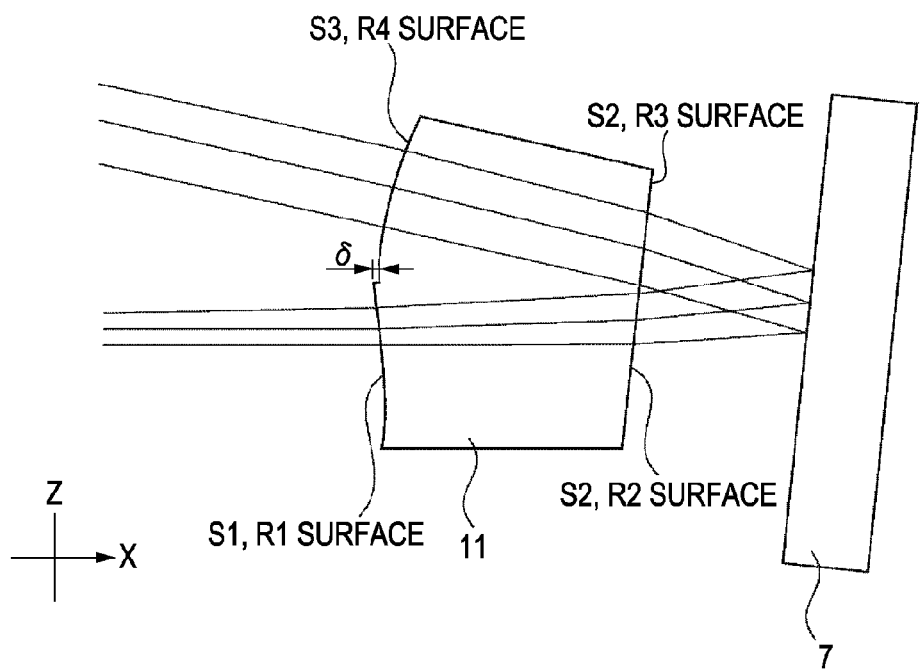
FIG. 3 illustrates a sub-scanning section of an imaging optical system according to the first embodiment.

As illustrated in FIG. 3, the light beam subjected to scanning and deflected by the deflecting surface of the optical deflector 6 enters the first transmitting surface S1 (R1 surface), which is nearest to the optical deflector 6.

The light beam from the first transmitting surface S1 is emitted from the second transmitting surface S2 (R2 surface) toward the planar reflector 7.

The light beam reflected by the reflecting surface of the planar reflector 7 enters the third transmitting surface S2 (R3 surface), passes through the fourth transmitting surface S3 (R4 surface), which is nearest to the photo-conductive surface 12, and reaches the photo-conductive surface 12.

The planar reflector 7 is disposed in an optical path between the second transmitting surface S2 (R2 surface) and the third transmitting surface S2 (R3 surface).

The surface shape of the imaging lens 11 according to the present embodiment is shown in Table 1.

The origin of the relative coordinate system for each of the transmitting surfaces (optical surfaces) and the direction cosine of its reference optical axis are shown in Table 2 and are schematically illustrated in FIG. 4.

The relative coordinate system shown in Table 2 is represented with reference to the origin of the absolute coordinate system.

The origin of the absolute coordinate system is the position where a principal ray of a light beam that is to reach the center of scanning on the photo-conductive surface 12 after being subjected to scanning and deflected at the deflecting surface 6a of the optical deflector 6 is deflected and reflected at the deflecting surface 6a of the optical deflector 6.

The on-axis light beam is the light beam reaching the center of scanning on the photo-conductive surface 12 after being subjected to scanning and deflected by the deflecting surface 6a of the optical deflector 6 in the main-scanning section.

Figure 5A:
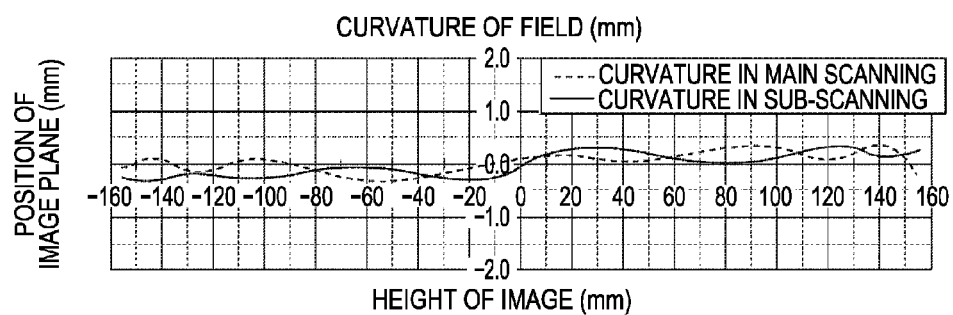
FIGS. 5A to 5C illustrate optical characteristics according to the first embodiment.
Figure 5B:
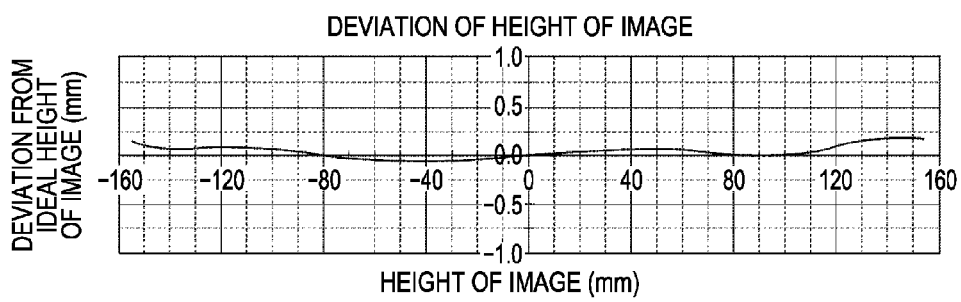
Figure 5C:
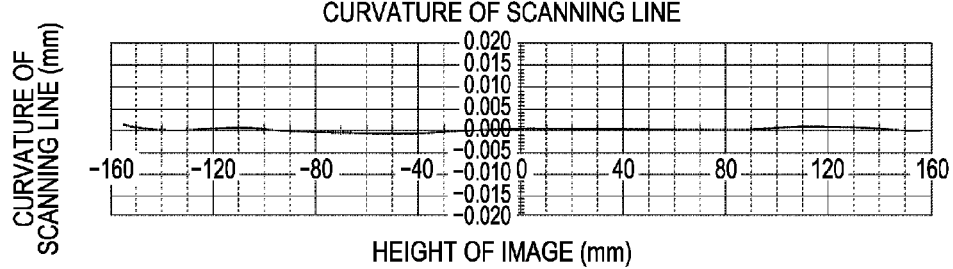

The optical characteristics according to the first embodiment are illustrated in FIGS. 5A to 5C.

The horizontal axis of each of FIGS. 5A to 5C represents the height of an image (mm). The height of an image indicates the position in the main scanning direction on the photo-conductive surface 12.

FIG. 5A illustrates the amount of curvature of field on the photo-conductive surface 12. In FIG. 5A, the broken line indicates the amount of curvature of field in the main scanning direction, and the solid line indicates the amount of curvature of field in the sub-scanning direction.

FIG. 5B illustrates the amount of deviation of the height of an image on the photo-conductive surface 12. The amount of deviation of the height of an image indicates the amount of deviation of the position of a spot in the main scanning direction.

FIG. 5C illustrates the amount of curvature of the scanning line on the photo-conductive surface 12. The amount of curvature of the scanning line indicates the amount of deviation of the scanning line in the sub-scanning direction.

TABLE 1

| | |
|---|---|
| Used Wavelength (mm) | 7.90E−07 |
| Refractive Index of Imaging Optical System | 1.523972 |
| No. of Surfaces of Deflecting Unit | 6 |
| Radius (mm) of Circumradius of Deflecting Unit | 40 |
| Rotation Angle (±deg.) of Deflecting Unit | 21 |
| Incident Angle (deg.) in Main Scanning Direction | 65 |
| Incident Angle (deg.) in Sub-scanning Direction | 0 |
| Plane of Incidence (mm) of Axial Deflecting Point - Imaging Lens | 4.50E+01 |
| Focal Length (mm) of Imaging Lens | 2.12E+02 |

Coordinates of Center of Rotation of Deflecting Unit (in Absolute Coordinate System)

| | | |
|---|---|---|
| | X | −15.361 |
| | Y | −8.124 |

| | | R1 Surface | | R2 Surface | |
|---|---|---|---|---|---|
| | | Scanning Start Side (s) | Scanning End Side (e) | Scanning Start Side (s) | Scanning End Side (e) |
| Main Scanning Section | d | 1.10E+01 | | 1.300E+02 | |
| | R | 6.55E+02 | | −3.30E+02 | |
| | K | 0.00E+00 K | 0.00E+00 | K 0.00E+00 K | 0.00E+00 |
| | B4 | 1.56E−07 B4 | 1.60E−07 | B4 2.43E−07 B4 | 2.43E−07 |
| | B6 | 2.67E−11 B6 | 2.09E−11 | B6 1.78E−11 B6 | 1.78E−11 |
| | B8 | −1.19E−15 B8 | 6.22E−16 | B8 −4.70E−15 B8 | −4.70E−15 |
| | B10 | −6.83E−19 B10 | −8.51E−19 | B10 7.96E−20 B10 | 7.96E−20 |
| Sub-Scanning Section | r | −4.97E+01 | | r 0.00E+00 | |
| | D2 | 7.41E−04 D2 | 7.89E−04 | D2 1.10E−04 D2 | 1.17E−04 |
| | D4 | 5.85E−08 D4 | −1.69E−08 | D4 −8.98E−09 D4 | −2.11E−08 |
| | D6 | 8.53E−11 D6 | 1.65E−10 | D6 −1.51E−12 D6 | 5.25E−12 |
| | D8 | −3.49E−14 D8 | −7.64E−14 | D8 7.54E−16 D8 | −1.10E−15 |
| | D10 | −2.28E−18 D10 | 5.72E−18 | D10 −8.30E−20 D10 | 1.12E−19 |
| | A0 | −3.40E+00 | | A0 0.00E+00 | |
| | A1 | 0.00E+00 | | A1 0.00E+00 | |
| | A2 | −5.67E−04 | | A2 0.00E+00 | |
| | A3 | 0.00E+00 | | A3 0.00E+00 | |
| | A4 | 4.33E−07 | | A4 0.00E+00 | |
| | A5 | 0.00E+00 | | A5 0.00E+00 | |
| | A6 | 0.00E+00 | | A6 0.00E+00 | |
| | A7 | 0.00E+00 | | A7 0.00E+00 | |

TABLE 1-continued

|  | A8 | 0.00E+00 |  | A8 | 0.00E+00 |  |
| --- | --- | --- | --- | --- | --- | --- |
|  | R3 Surface |  |  | R4 Surface |  |  |
|  | Scanning Start Side (s) | | Scanning End Side (e) | | Scanning Start Side (s) | | Scanning End Side (e) | |

| | | Scanning Start Side (s) | | Scanning End Side (e) | | Scanning Start Side (s) | | Scanning End Side (e) | |
|---|---|---|---|---|---|---|---|---|
| Main scanning Section | d | | 1.14E+01 | | d | | 1.97E+02 | |
| | R | 3.30E+02 | | | R | −6.55E+02 | | |
| | K | 0.00E+00 | K | 0.00E+00 | K | 0.00E+00 | K | 0.00E+00 |
| | B4 | −2.43E−07 | B4 | −2.43E−07 | B4 | −1.56E−07 | B4 | −1.60E−07 |
| | B6 | −1.78E−11 | B6 | −1.78E−11 | B6 | −2.67E−11 | B6 | −2.09E−11 |
| | B8 | 4.70E−15 | B8 | 4.70E−15 | B8 | 1.19E−15 | B8 | −6.22E−16 |
| | B10 | −7.96E−20 | B10 | −7.96E−20 | B10 | 6.83E−19 | B10 | 8.51E−19 |
| Sub-Scanning Section | r | 0.00E+00 | | | r | −2.45E+01 | | |
| | D2 | 0.00E+00 | D2 | 0.00E+00 | D2 | 1.10E−04 | D2 | 1.17E−04 |
| | D4 | 0.00E+00 | D4 | 0.00E+00 | D4 | −8.98E−09 | D4 | −2.11E−08 |
| | D6 | 0.00E+00 | D6 | 0.00E+00 | D6 | −1.51E−12 | D6 | 5.25E−12 |
| | D8 | 0.00E+00 | D8 | 0.00E+00 | D8 | 7.54E−16 | D8 | −1.10E−15 |
| | D10 | 0.00E+00 | D10 | 0.00E+00 | D10 | −8.30E−20 | D10 | 1.12E−19 |
| | A0 | 0.00E+00 | | | A0 | −8.61E−01 | | |
| | A1 | 0.00E+00 | | | A1 | 0.00E+00 | | |
| | A2 | 0.00E+00 | | | A2 | −3.33E−04 | | |
| | A3 | 0.00E+00 | | | A3 | 0.00E+00 | | |
| | A4 | 0.00E+00 | | | A4 | 8.36E−09 | | |
| | A5 | 0.00E+00 | | | A5 | 0.00E+00 | | |
| | A6 | 0.00E+00 | | | A6 | 3.12E−12 | | |
| | A7 | 0.00E+00 | | | A7 | 0.00E+00 | | |
| | A8 | 0.00E+00 | | | A8 | 4.40E−16 | | |

TABLE 2

Coordinates of Each Surface Vertex and Direction Cosine of Reference Axis (Optical Axis)

| | Coordinate System of Each Surface (Relative Coordinate System) | | | Direction Cosine of X Axis in Relative Coordinate System | | |
|---|---|---|---|---|---|---|
| | X | Y | Z | gx | gy | gz |
| R1 Surface (S1 Surface) | 45.0000 | 0.0000 | 0.0000 | 1.00000 | 0.00000 | 0.00000 |
| R2 Surface (S2 Surface) | 56.0000 | 0.0000 | 0.0000 | 0.99357 | 0.00000 | −0.11320 |
| Reflecting Surface | 63.5000 | 0.0000 | 0.0000 | −0.99357 | 0.00000 | 0.11320 |
| R3 Surface (S2 Surface) | 56.1922 | 0.0000 | 1.6871 | −0.99357 | 0.00000 | 0.11320 |
| R4 Surface (S3 Surface) | 45.0844 | 0.0000 | 4.2516 | −0.97437 | 0.00000 | 0.22495 |
| Surface To Be Scanned | −146.4768 | 0.0000 | 48.4770 | 0.97437 | 0.00000 | 0.22495 |

In the present embodiment, the shape of each of the surfaces S1 to S3 of the imaging lens 11 is represented by the expressions described below.

The origin and the direction cosine of the reference optical axis of the lens surface of each of the first transmitting surface S1 (R1 surface), the second transmitting surface S2 (R2 surface), the third transmitting surface S2 (R3 surface), and the fourth transmitting surface S3 (R4 surface) are determined in the coordinate system illustrated in Table 2 and FIG. 4.

The surface shape according to the present embodiment at the scanning start side and at the scanning end side with respect to the optical axis, as illustrated in Table 1, can be represented by the continuous function described below, where the x-axis is the optical axis of the imaging lens 11, the y-axis is the direction perpendicular to the optical axis in the main-scanning section, and the z-axis is the direction perpendicular to the optical axis in the sub-scanning section.

The expression of defining the scanning start side is as follows:

$$x = \frac{y^2/R}{1+\sqrt{1-(1+K)(y/R)^2}} + B_{4s}y^4 + B_{6s}y^6 + B_{8s}y^8 + B_{10s}y^{10}$$

The expression of defining the scanning end side e is as follows:

$$x = \frac{y^2/R}{1+\sqrt{1-(1+K)(y/R)^2}} + B_{4e}y^4 + B_{6e}y^6 + B_{8e}y^8 + B_{10e}y^{10}$$

In the expressions, R is the radius of curvature, and K, $B_4$, $B_6$, $B_8$, and $B_{10}$ is the aspheric coefficients. The suffix s of the coefficients represents the scanning start side, and the suffix e thereof represents the scanning end side.

The meridional line formed from surface vertices of the sagittal line is curved in the Z direction. The function representing the curvature of the meridional line is provided below.

$$z = \sum_{i=0}^{n} A_i y^i$$

In the expression, Ai is the coefficient representing the curvature of the meridional line in the Z direction.

The definitions of the surface vertex of the sagittal line, the radius of curvature in the sub-scanning direction, the power in the sub-scanning direction, the radius of curvature in the main scanning direction, and the power in the main scanning direction according to the present embodiment are predicated on the relative coordinate system.

The surface vertex of the sagittal line is a point in a sub-scanning section that contains the normal to the lens surface (optical surface) of the imaging lens 11.

In the present embodiment, the radius of curvature of the imaging lens 11 in the sub-scanning direction is in a sub-scanning section that contains the normal to the lens surface (optical surface) of the imaging lens 11.

In the present embodiment, the power of the imaging lens 11 in the sub-scanning direction is in a sub-scanning section that contains the normal to the lens surface (optical surface) of the imaging lens 11.

In the present embodiment, the radius of curvature of the imaging lens 11 in the main scanning direction is in a main-scanning section.

In the present embodiment, the power of the imaging lens 11 in the main scanning direction is in a main-scanning section.

In the present embodiment, each of the first transmitting surface (S1 surface) and the fourth transmitting surface (S3 surface) has a shape in a main-scanning section that is asymmetric with respect to the optical axis, whereas the S2 surface is symmetric with respect to the optical axis.

That is, each of the S1 and S3 surfaces has different aspheric coefficients at the scanning start side and at the scanning end side, whereas the S2 surface has the same aspheric coefficient at the scanning start side and at the scanning end side.

This compensates for an inclination of an image plane caused by decentered arrangement of the optical axis of the imaging lens 11 to effectively utilize the deflecting surface.

The radius of curvature of each of the S1 and S3 surfaces of the imaging lens 11 in the sub-scanning direction is asymmetrically and continuously changed within an effective area of the imaging lens 11 at the scanning start side and at the scanning end side with respect to the optical axis of the imaging lens 11.

This cancels the adverse effects of asymmetric aberration caused by a sag of the deflecting surface of the polygonal mirror (optical deflector) 6.

The sag indicates movement of the deflecting surface along the direction of the optical axis of the first transmitting surface S1 (R1 surface) by rotation of the polygonal mirror (optical deflector) 6.

Because the rotation shaft of the polygonal mirror (optical deflector) 6 is not located on the deflecting surface 6a but on the position apart from the deflecting surface 6a, a deflecting reflective point at which a light beam incident on the deflecting surface is reflected at the deflecting surface moves along the direction of the optical axis of the first transmitting surface S1 (R1 surface) together with the rotation of the polygonal mirror (optical deflector) 6.

The movement of the deflecting reflective point is asymmetrically performed with respect to the optical axis of the first transmitting surface (S1 surface), that optical axis serving as the center, in a main-scanning section, thus resulting in asymmetric aberration (e.g., curvature of field, distortion aberration) on the photo-conductive surface 12.

In addition, a spot shape (wave aberration) of the photo-conductive surface 12 and curvature of the scanning line are reduced by the curving of a line in which the surface vertices of the sagittal line are joined (meridional line) in the Z direction.

The shape in the sub-scanning section can be represented by a continuous function described below, where the x-axis is the optical axis of the first transmitting surface (S1 surface), the y-axis is the direction perpendicular to the optical axis in the main-scanning section, and the z-axis is the direction perpendicular to the optical axis in the sub-scanning section containing the optical axis of the first transmitting surface (S1 surface). As previously described, the surface vertex z of the sagittal line changes according to the Y coordinate.

The expression of defining the scanning start side is as follows:

$$S = \frac{z^2/r'}{1+\sqrt{1-(z/r')^2}}$$
$$r' = r(1 + D_{2s}y^2 + D_{4s}y^4 + D_{6s}y^6 + D_{8s}y^8 + D_{10s}y^{10})$$

The expression of defining the scanning end side e is as follows:

$$S = \frac{z^2/r'}{1+\sqrt{1-(z/r')^2}}$$
$$r' = r(1 + D_{2e}y^2 + D_{4e}y^4 + D_{6e}y^6 + D_{8e}y^8 + D_{10e}y^{10})$$

In the expressions, r' represents the radius of curvature in the sub-scanning direction and $D_2$, $D_4$, $D_6$, $D_8$, and $D_{10}$ represent coefficients.

Again, the suffix s of the coefficients represents the scanning start side, and the suffix e thereof represents the scanning end side.

Here, the radius of curvature in the sub-scanning direction (radius of curvature in the direction of the sagittal line) indicates the radius of curvature in the sub-scanning section containing the normal to the lens surface (optical surface) of the imaging lens 11.

Numeric values of the optical scanning apparatus according to the first embodiment are shown in Table 1.

Here, "E-x" indicates "$10^{-x}$."

FIG. 3 illustrates an enlarged view of the imaging lens 11 in the sub-scanning section.

When a light beam subjected to scanning and deflected by the deflecting surface of the optical deflector 6 is projected in the sub-scanning section containing the optical axis of the first transmitting surface (S1 surface), the light beam enters the first transmitting surface (S1 surface) at no finite angle with respect to the first transmitting surface (S1 surface), is refracted at the first transmitting surface (S1 surface) in the main scanning direction by a positive power (convex power) in the sub-scanning direction by a negative power (concave power), and enters the second transmitting surface (S2 surface).

In other words, when a light beam subjected to scanning and deflected by the deflecting surface of the optical deflector 6 is projected in the sub-scanning section containing the optical axis of the first transmitting surface (S1 surface), it is the same as the direction of the normal to the deflecting surface.

The line in which the surface vertices of the sagittal line are joined (meridional line) in the main scanning direction of the first transmitting surface (S1 surface) is decentered to the sub-scanning direction (Z direction), and the first transmitting surface (S1 surface) is curved in the sub-scanning direction (Z direction).

The optical axis of the first transmitting surface S1 (R1 surface) is arranged in parallel with the normal to the deflecting surface of the optical deflector 6 (in parallel with the X direction in the absolute coordinate system).

This aims to favorably compensate for a spot shape (wave aberration) on the photo-conductive surface 12 and to reduce the curvature of the scanning line.

The second transmitting surface (S2 surface) includes a positive power (convex power) in the main scanning direction and a plane (zero power) in the sub-scanning direction in the vicinity of the on axis (the optical axis of the second transmitting surface S2 (R2 surface).

The optical axis of the second transmitting surface (S2 surface) is inclined 6.5° toward the normal to the deflecting surface (toward the x-axis) in the sub-scanning section. A light beam refracted by the second transmitting surface (S2 surface) is incident on the planar reflector 7.

The reflecting surface of the planar reflector 7 is made using a non-abrasive mirror in which a reflective film is deposited on a float glass base material and the resultant structure is simply cut into a predetermined size.

The normal to the reflecting surface of the planar reflector 7 is inclined 6.5° toward the normal to the deflecting surface (the absolute coordinate system) in the sub-scanning section.

A light beam reflected by the planar reflector 7, serving as a reflective optical element, re-enters the third transmitting surface (S2 surface), is refracted by a positive power (convex power) in the main scanning direction, and enters the fourth transmitting surface (S3 surface).

In the sub-scanning section, the optical axis of the fourth transmitting surface (S3 surface) is inclined 13° toward the normal to the deflecting surface of the optical deflector 6 (toward the x-axis in the absolute coordinate system). The fourth transmitting surface (S3 surface) includes a plane that has a positive power (convex power) in both the main scanning direction and the sub-scanning direction.

The line in which the surface vertices of the sagittal line are joined (meridional line) in the main scanning direction of the fourth transmitting surface (S3 surface) is decentered to the sub-scanning direction (Z direction), and the fourth transmitting surface (S3 surface) is curved in the sub-scanning direction (Z direction), similar to the first transmitting surface (S1 surface).

This aims to favorably compensate for a spot shape (wave aberration) on the photo-conductive surface and to reduce the curvature of the scanning line, together with the first transmitting surface (S1 surface).

In the present embodiment, the meridional line shape of the first transmitting surface (S1 surface) and that of the fourth transmitting surface (S3 surface) are the same for the advantage of processing of a forming die of a plastic lens.

To reduce lateral magnification in the sub-scanning direction, reduce the adverse effects of a face tangle, and thus achieve a higher-definition optical scanning apparatus, the first transmitting surface (S1 surface) has a negative (concave) power in the sub-scanning direction, the fourth transmitting surface (S3 surface) has a positive (convex) power in the sub-scanning direction, and the S1 and S3 surfaces have different sub-scanning section shapes.

If the first transmitting surface (S1 surface) has a positive (convex) power in the sub-scanning direction, it would be disadvantageous because the lateral magnification in the sub-scanning direction would be high.

The width of a light beam of an on-axis light beam in the sub-scanning direction on the first transmitting surface (S1 surface) illustrated in FIG. 3 is w1, and that on the fourth transmitting surface (S3 surface) is w2.

When the length of an optical path from the first transmitting surface (S1 surface) to the planar reflector 7 is L2 and the angle between the normal to the reflecting surface of the planar reflector 7 in the sub-scanning section and the normal to the deflecting surface of the optical deflector 6 is α (tilt angle), the tilt angle α (deg.) of the planar reflector 7 is determined such that the condition described below is satisfied.

$$\tan(2\alpha) > \{(w1+w2)/2\}/L2 \tag{1}$$

for L2=18.5 mm
w1=1.91 mm
w2=3.64 mm
α=6.5 deg.
tan(2α)=0.23

When the conditional expression (1) is satisfied, the optical scanning apparatus can have a reduced thickness and a light beam passing through the first transmitting surface (S1 surface) and that passing through the fourth transmitting surface (S3 surface) can be separated in the sub-scanning section. Thus, the high-resolution optical scanning system can be achieved.

To reduce the thickness of the optical scanning apparatus, it is useful that the tilt angle α of the planar reflector 7 be equal to or smaller than 20°. If the tilt angle α of the planar reflector 7 exceeds 20°, it is difficult to reduce the thickness of the optical scanning apparatus.

To further reduce the thickness of the optical scanning apparatus, it is useful that the tilt angle α of the planar reflector 7 be equal to or smaller than 10°.

When the tilt angle α of the planar reflector 7 is equal to or smaller than 10°, the advantage of suppressing irregularities of a spot shape on the photo-conductive surface 12 is also obtainable.

That is, it is useful that α is larger than 0 deg. and smaller than 20 deg.

If α does not satisfy the above condition, the size of the imaging lens 11 is increased and this results in an increase in cost.

If the tilt angle α of the planar reflector 7 is at or below 2° (deg.), a light beam in the first transmitting surface (S1 surface) and that in the fourth transmitting surface (S3 surface) overlap each other, which reduces resolution.

It is useful that α is larger than 2 deg. and smaller than 20 deg.

FIGS. 9A and 9D illustrate a main-scanning section of the imaging lens 11, and FIGS. 9B and 9C illustrate a sub-scanning section thereof.

FIG. 9A illustrates the imaging lens 11 viewed from the above (X-Y plane). FIGS. 9B and 9C illustrate an enlarged view of the imaging lens 11 in a section (IXB-IXB) at a position of Y=63.5 mm of FIG. 9A and in a section (IXC-IXC) at a position of Y=0 of FIG. 9A, respectively, such that the imaging lens 11 is tilted in the sub-scanning section.

In FIG. 9D, the broken lines indicate an effective area of the first transmitting surface (R1 surface) and that of the fourth transmitting surface (R4 surface). The R1 surface has an effective portion 102, and the R4 surface has an effective portion 103. The effective portions 102 and 103 are disposed adjacent to the opposite sides of a boundary portion 101.

Figure 6A:
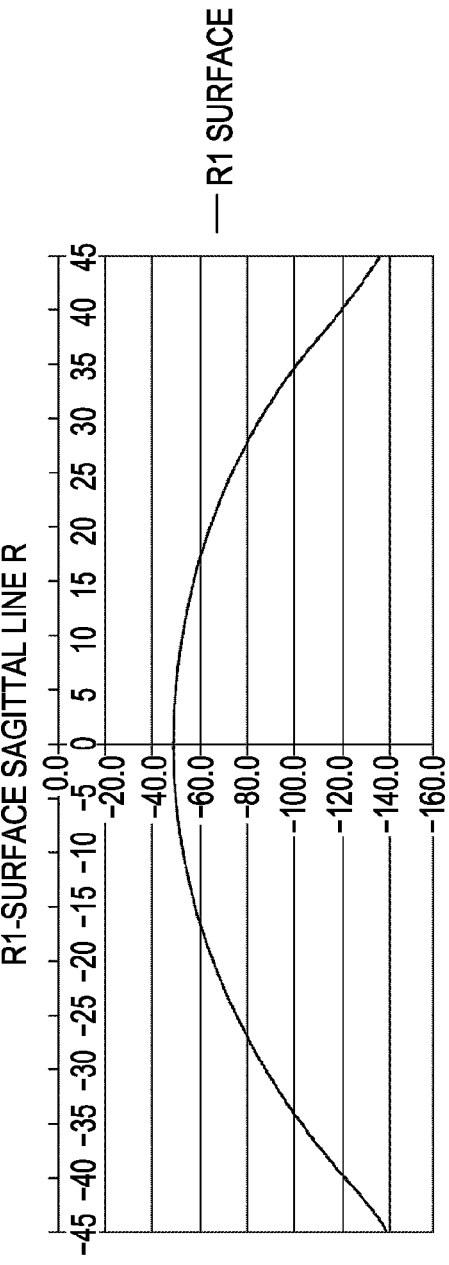
FIGS. 6A and 6B illustrate changes in sagittal line R of an imaging lens according to the first embodiment.
Figure 6B:
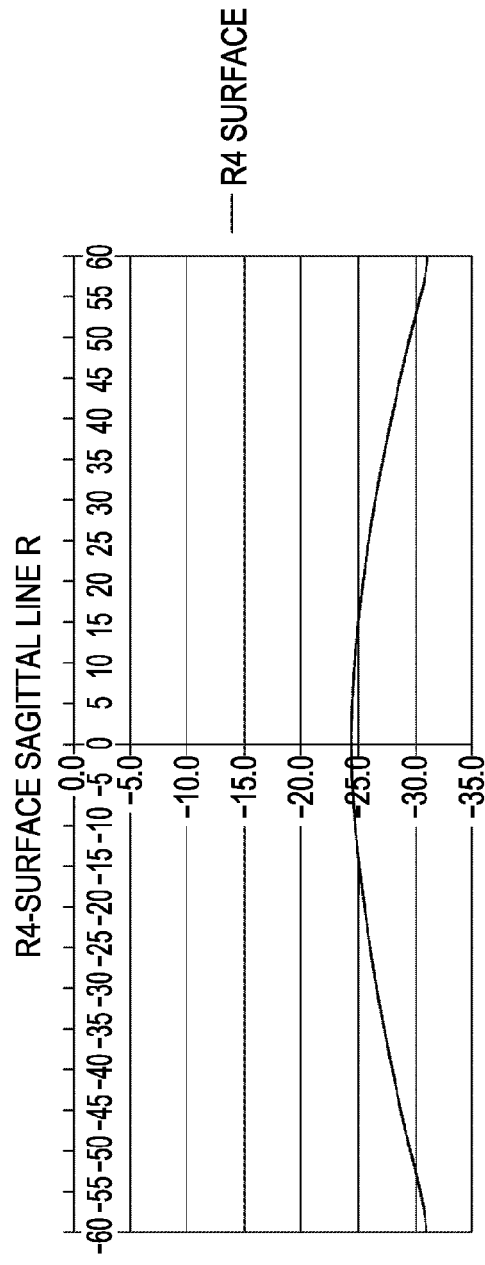
Figure 7A:
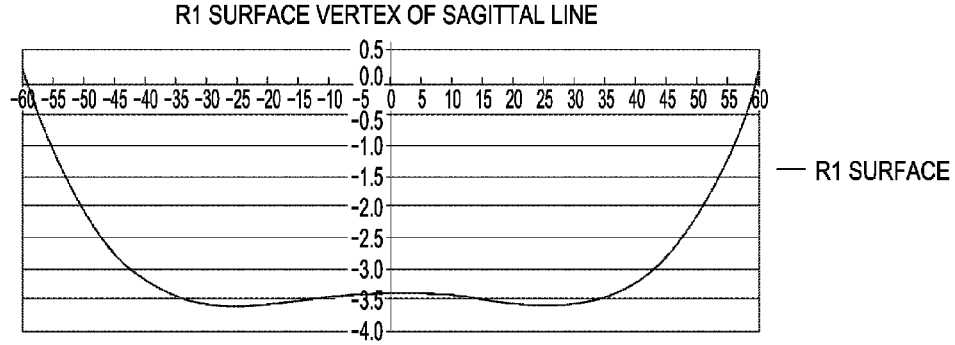
FIGS. 7A and 7B illustrate changes in surface vertex of a sagittal line of the imaging lens according to the first embodiment.
Figure 7B:
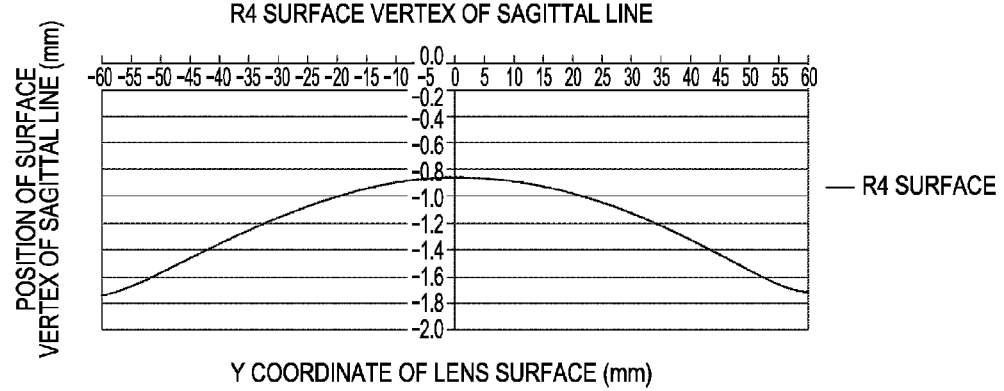

In the present embodiment, as illustrated in Table 1 and FIGS. 6A and 6B, the radius of curvature of the first transmitting surface S1 (R1 surface) in the sub-scanning direction and that of the fourth transmitting surface S3 (R4 surface) change in the Y direction, and, as illustrated in Table 1 and FIGS. 7A and 7B, the vertex of the sagittal line changes in the Y direction. Thus, the amount δ of the step has different values in the Y direction.

In FIG. 6A, the vertical axis indicates the radius of curvature in millimeters of the first transmitting surface S1 (R1 surface) in the sub-scanning direction (the direction of the sagittal line), and the horizontal axis indicates the position of the lens surface in millimeters in the main scanning direction.

In FIG. 6B, the vertical axis indicates the radius of curvature in millimeters of the fourth transmitting surface S3 (R4 surface) in the sub-scanning direction (the direction of the sagittal line), and the horizontal axis indicates the position of the lens surface in millimeters in the main scanning direction.

In FIG. 7A, the vertical axis indicates the position of the surface vertex of the sagittal line in millimeters of the first transmitting surface S1 (R1 surface), and the horizontal axis indicates the position of the lens surface in millimeters in the main scanning direction (Y direction).

In FIG. 7B, the vertical axis indicates the position of the surface vertex of the sagittal line in millimeters of the fourth transmitting surface S3 (R4 surface), and the horizontal axis indicates the position of the lens surface in millimeters in the main scanning direction (Y direction).

Figure 8:
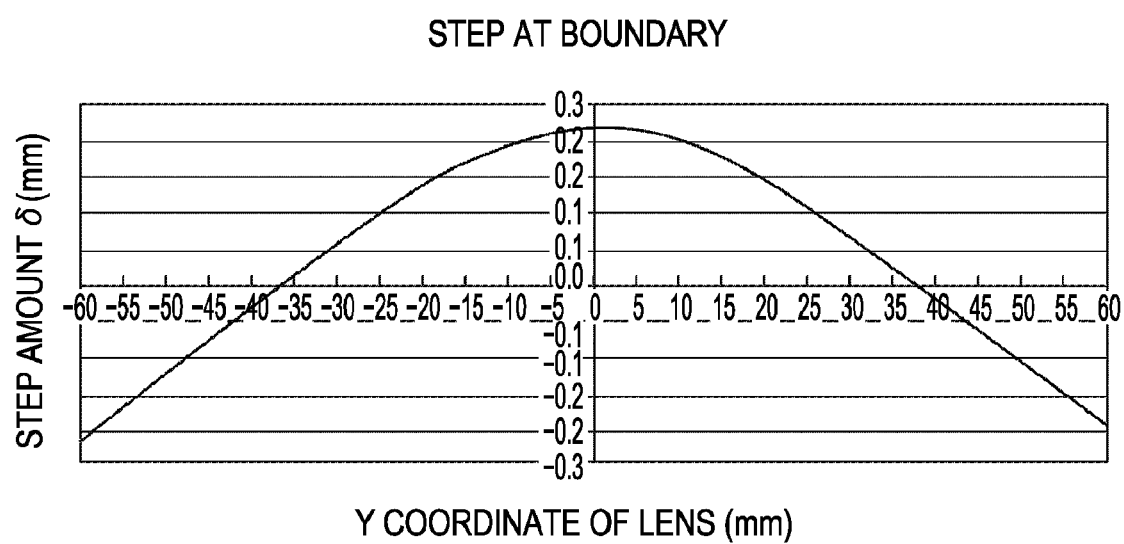
FIG. 8 illustrates a change in amount of a step of the imaging lens according to the first embodiment.

FIG. 8 illustrates a relationship between the amount 6 of the step (mm) and Y (mm) according to the present embodiment.

Y (mm) indicates the position of the lens surface in millimeters in the main scanning direction (Y direction).

In the present embodiment, the first transmitting surface S1 (R1 surface) and the fourth transmitting surface S3 (R4 surface) have different thicknesses such that the absolute value of the amount δ of the step is small, and the thicknesses are determined such that the amount δ of the step satisfies |δ|=0 at least one location in the lens effective area.

The amount δ of the step (mm) in the direction of the optical axis (X direction) between the first transmitting surface S1 (R1 surface) and the fourth transmitting surface S3 (R4 surface) satisfies the following conditional expression within the lens effective area of the imaging lens 11.

$$(L2/2) \times \tan(2\alpha) - (w1+w2)/4 > |\delta|, 0.74 > |\delta| \quad (2)$$

When the amount of the step is determined so as to satisfy the conditional expression (2), the adverse effect of a surface defective (tendency) occurring in the vicinity of the step in forming is avoidable and the adverse effect of an error of the position where a light beam passes through the lens resulting from an error of arrangement of the imaging lens 11 is also avoidable.

In FIG. 8, the plus of the amount of the step indicates that the step projects toward the first transmitting surface S1 (R1 surface).

In the first embodiment, the amount of the step within the lens effective area is reduced by the lens having different lens thicknesses. However, a way to reduce the amount δ of the step is not limited to having different thicknesses.

For example, similar advantages are obtainable with different meridional line shapes and may also be obtained when the corners of the step are trimmed to reduce the amount δ of the step.

When the corners of the step are trimmed, the stability of forming the optical surface in the vicinity of the step can be improved, and it is useful that the amount of trimming the corners change in the Y direction according to the amount δ of the step.

The step according to the first embodiment is disposed in the direction of the normal to the reflecting surface of the planar reflector 7.

In the present embodiment, the imaging lens 11, which serves as a refractive optical element, is constructed using only a refractive power. However, similar advantages are obtainable with a diffractive optical element having a diffractive power.

In the present invention, a composite optical element in which a diffraction grating is formed on the refractive surface of a refractive optical element may be used.

In the present embodiment, a non-abrasive float glass base material in itself is used as the planar reflector 7, serving as a reflective optical element. However, similar advantages are obtainable with a mirror that is grinded to improve profile irregularity.

The imaging lens consisting of a single lens element may be constructed of two or more lens elements.

As described above, in the present embodiment, by satisfying the conditional expression (1) without causing a light beam to be obliquely incident on the deflecting surface 6a of the optical deflector 6 in the sub-scanning section, the following advantages are obtainable.

That is, the advantages are that the optical scanning apparatus can have a reduced thickness, a light beam passing through the first transmitting surface (S1 surface) of the imaging lens 11 and a light beam passing through the fourth transmitting surface (S3 surface) can be separated in the sub-scanning section, and the high-resolution optical scanning apparatus can be achieved.

A second embodiment of the present invention is described next which differs from the first embodiment in that the length of the optical path from the optical deflector 6 to the photo-conductive surface 12 is smaller than that in the first embodiment.

The other respects the configuration of the second embodiment is substantially the same as in the first embodiment. The differences between the first and second embodiments are described below.

Figure 10:
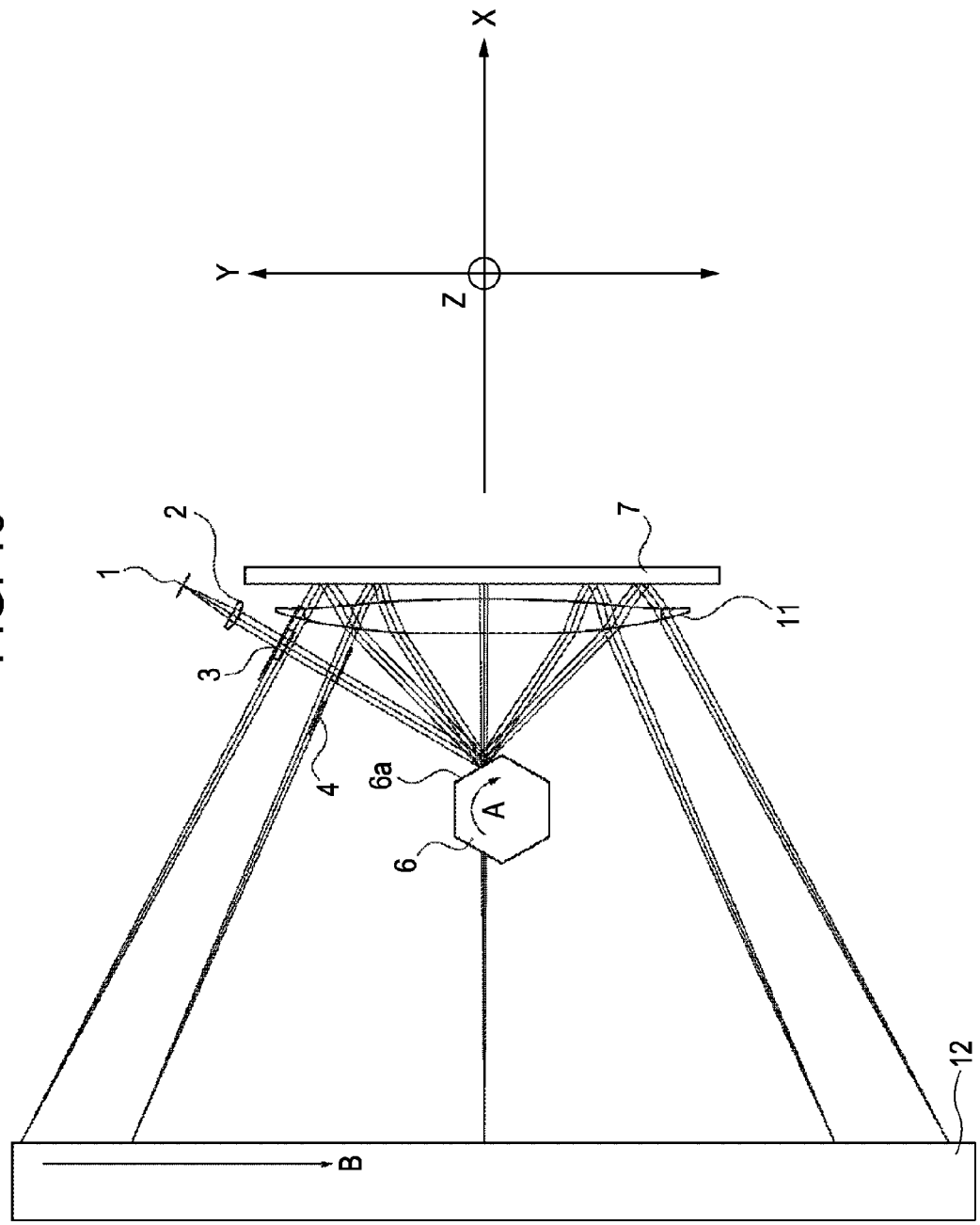
FIG. 10 illustrates a main-scanning section according to a second embodiment of the present invention.

FIG. 10 illustrates a main-scanning section of the optical scanning apparatus according to the present embodiment.

Figure 11A:
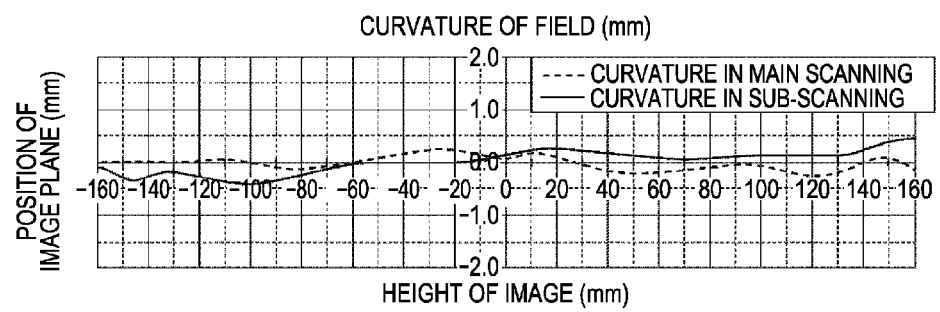
FIGS. 11A to 11C illustrate optical characteristics according to the second embodiment.
Figure 11B:
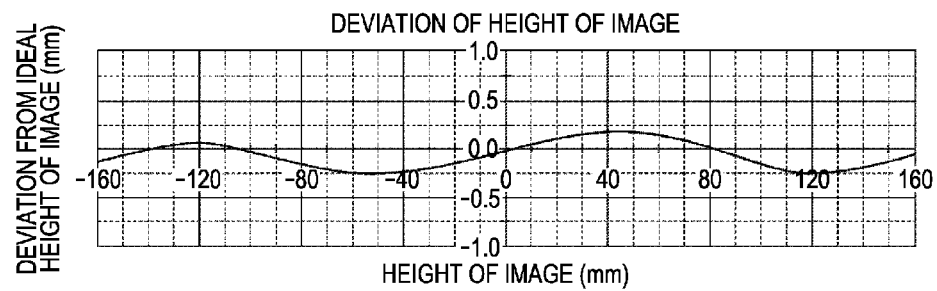
Figure 11C:
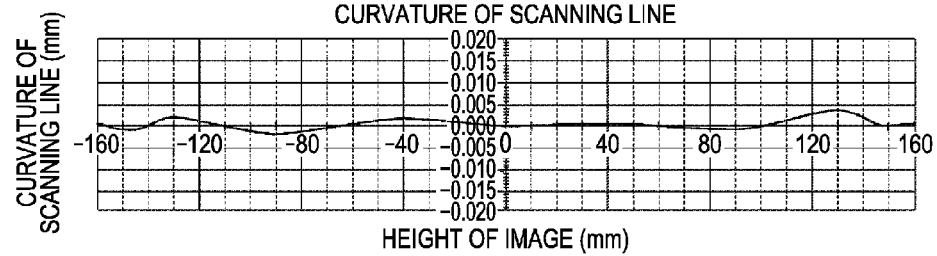

Table 3 shows data of arrangement and shape of an optical system of the optical scanning apparatus. FIGS. 11A to 11C illustrate optical performance of the optical scanning apparatus according to the present embodiment.

FIG. 11A illustrates the amount of curvature of field on the photo-conductive surface 12. In FIG. 11A, the broken line indicates the amount of curvature of field in the main scanning direction, and the solid line indicates the amount of curvature of field in the sub-scanning direction.

FIG. 11B illustrates the amount of deviation of the height of an image on the photo-conductive surface 12. The amount of deviation of the height of an image indicates the amount of deviation of the position of a spot in the main scanning direction.

FIG. 11C illustrates the amount of curvature of the scanning line on the photo-conductive surface 12. The amount of curvature of the scanning line indicates the amount of deviation of the scanning line in the sub-scanning direction.

TABLE 3

| | |
|---|---|
| Used Wavelength (mm) | 7.90E−07 |
| Refractive Index of Imaging Optical System | 1.523972 |
| No. of Surfaces of Deflecting Unit | 6 |
| Radius (mm) of Circumradius of Deflecting Unit | 40 |
| Rotation Angle (±deg.) of Deflecting Unit | 22.4 |
| Incident Angle (deg.) in Main Scanning Direction | 60 |
| Incident Angle (deg.) in Sub-scanning Direction | 0 |
| Plane of Incidence (mm) of Axial Deflecting Point - Imaging Lens | 4.40E+01 |
| Focal Length (mm) of Imaging Lens | 2.00E+02 |

Coordinates of Center of Rotation of Deflecting Unit
(in Absolute Coordinate System)

| | |
|---|---|
| X | −15.695 |
| Y | −7.457 |

| | | R1 Surface | | R2 Surface | |
|---|---|---|---|---|---|
| | | Scanning Start Side (s) | Scanning End Side (e) | Scanning Start Side (s) | Scanning End Side (e) |
| Main Scanning Section | d | 1.10E+01 | | 1.300E+02 | |
| | R | 6.55E+02 | | −3.30E+02 | |
| | K | 0.00E+00 | 0.00E+00 | 0.00E+00 | 0.00E+00 |
| | B4 | 1.56E−07 | 1.60E−07 | 2.43E−07 | 2.43E−07 |
| | B6 | 2.67E−11 | 2.09E−11 | 1.78E−11 | 1.78E−11 |
| | B8 | −1.19E−15 | 6.22E−16 | −4.70E−15 | −4.70E−15 |
| | B10 | −6.83E−19 | −8.51E−19 | 7.96E−20 | 7.96E−20 |
| Sub-Scanning Section | r | −4.97E+01 | | 0.00E+00 | |
| | D2 | 7.41E−04 | 7.89E−04 | 1.10E−04 | 1.17E−04 |
| | D4 | 5.85E−08 | −1.69E−08 | −8.98E−09 | −2.11E−08 |
| | D6 | 8.53E−11 | 1.65E−10 | −1.51E−12 | 5.25E−12 |
| | D8 | −3.49E−14 | −7.64E−14 | 7.54E−16 | −1.10E−15 |
| | D10 | −2.28E−18 | 5.72E−18 | −8.30E−20 | 1.12E−19 |
| | A0 | −3.40E+00 | | 0.00E+00 | |
| | A1 | 0.00E+00 | | 0.00E+00 | |
| | A2 | −5.67E−04 | | 0.00E+00 | |
| | A3 | 0.00E+00 | | 0.00E+00 | |
| | A4 | 4.33E−07 | | 0.00E+00 | |
| | A5 | 0.00E+00 | | 0.00E+00 | |
| | A6 | 0.00E+00 | | 0.00E+00 | |
| | A7 | 0.00E+00 | | 0.00E+00 | |
| | A8 | 0.00E+00 | | 0.00E+00 | |

| | | R3 Surface | | R4 Surface | |
|---|---|---|---|---|---|
| | | Scanning Start Side (s) | Scanning End Side (e) | Scanning Start Side (s) | Scanning End Side (e) |
| Main Scanning Section | d | 1.14E+01 | | 1.97E+02 | |
| | R | 3.30E+02 | | −6.55E+02 | |
| | K | 0.00E+00 | 0.00E+00 | 0.00E+00 | 0.00E+00 |
| | B4 | −2.43E−07 | −2.43E−07 | −1.56E−07 | −1.60E−07 |
| | B6 | −1.78E−11 | −1.78E−11 | −2.67E−11 | −2.09E−11 |
| | B8 | 4.70E−15 | 4.70E−15 | 1.19E−15 | −6.22E−16 |
| | B10 | −7.96E−20 | −7.96E−20 | 6.83E−19 | 8.51E−19 |
| Sub-Scanning Section | r | 0.00E+00 | | −2.45E+01 | |
| | D2 | 0.00E+00 | 0.00E+00 | 1.10E−04 | 1.17E−04 |
| | D4 | 0.00E+00 | 0.00E+00 | −8.98E−09 | −2.11E−08 |
| | D6 | 0.00E+00 | 0.00E+00 | −1.51E−12 | 5.25E−12 |
| | D8 | 0.00E+00 | 0.00E+00 | 7.54E−16 | −1.10E−15 |
| | D10 | 0.00E+00 | 0.00E+00 | −8.30E−20 | 1.12E−19 |
| | A0 | 0.00E+00 | | −8.61E−01 | |
| | A1 | 0.00E+00 | | 0.00E+00 | |
| | A2 | 0.00E+00 | | −3.33E−04 | |
| | A3 | 0.00E+00 | | 0.00E+00 | |
| | A4 | 0.00E+00 | | 8.36E−09 | |
| | A5 | 0.00E+00 | | 0.00E+00 | |
| | A6 | 0.00E+00 | | 3.12E−12 | |
| | A7 | 0.00E+00 | | 0.00E+00 | |
| | A8 | 0.00E+00 | | 4.40E−16 | |

The coordinate system and the aspheric expression according to the second embodiment are the same as in the first embodiment.

In the second embodiment, the same reference numerals are used in the same elements as in the first embodiment.

The second embodiment is characteristic in that the following points are established to reduce the length of the optical path from the optical deflector 6 to the photo-conductive surface 12 and to achieve a more compact optical scanning apparatus than in the first embodiment.

(A) A light beam incident on the deflecting surface of the optical deflector from the incidence optical system 2, 3, and 4 converges weakly in the main-scanning section.

(B) The scanning angle is larger than in the first embodiment.

As for the point (A), in the second embodiment, a modulated light beam emitted from the light emitting unit 1 is converted into a weakly converging light beam in the main-scanning section by the collimator lens 2.

The modulated light beam emitted from the light emitting unit 1 is converted into a parallel light beam by the collimator lens 2 in the sub-scanning section.

The light beam that passed through the cylindrical lens 3, which has a power in the sub-scanning direction and zero power in the main scanning direction, converges in the sub-scanning direction and forms a line image that is long in the main scanning direction onto the deflecting surface 6a of the optical deflector 6.

Accordingly, in the present embodiment, the light beam entering the imaging lens 11 weakly converges in the main-scanning section.

Table 4 shows the origin of the coordinate system and the direction cosine of the reference optical axis of each surface to determine the shape of each of the first transmitting surface S1 (R1 surface), the second transmitting surface S2 (R2 surface), the third transmitting surface S2 (R3 surface), and the fourth transmitting surface (R4 surface).

The origin of the coordinate system of each surface according to the present embodiment is represented in reference to the origin of the absolute coordinate system, as in the first embodiment.

The surface shape of each of the first transmitting surface S1 (R1 surface), the second transmitting surface S2 (R2 surface), the third transmitting surface S2 (R3 surface), and the fourth transmitting surface S3 (R4 surface) is represented using the same function as in the first embodiment.

TABLE 4

Coordinates of Each Surface Vertex and Direction Cosine of Reference Axis (Optical Axis)

| | Coordinate System of Each Surface (Relative Coordinate System) | | | Direction Cosine of X Axis in Relative Coordinate System | | |
|---|---|---|---|---|---|---|
| | X | Y | Z | gx | gy | gz |
| R1 Surface (S1 Surface) | 44.0000 | 0.3200 | 0.0000 | 1.00000 | 0.00000 | 0.00000 |
| R2 Surface (S2 Surface) | 55.0000 | 0.3200 | 0.0000 | 0.99357 | 0.00000 | −0.11320 |
| Reflecting Surface | 60.5000 | 0.0000 | 0.0000 | −0.99357 | 0.00000 | 0.11320 |
| R3 Surface (S2 Surface) | 55.1410 | 0.3200 | 1.2372 | −0.99357 | 0.00000 | 0.11320 |
| R4 Surface (S3 Surface) | 44.0332 | 0.3200 | 3.8017 | −0.97437 | 0.00000 | 0.22495 |
| Surface To Be Scanned | −128.6252 | 0.3216 | 43.6630 | 0.97437 | 0.00000 | 0.22495 |

When the width of a light beam with respect to an on-axis light beam in the sub-scanning direction on the first transmitting surface S1 (R1 surface) is w1, and that on the fourth transmitting surface S3 (R4 surface) is w2, the length of the distance from the S1 surface to the planar reflector 7 is L2, and the tilt angle of the planar reflector 7 is α, the tilt angle α (deg.) of the planar reflector 7 is determined such that the condition described below is satisfied.

$$\tan(2\alpha) > \{(w1+w2)/2\}/L2 \quad (1)$$

for L2=16.5 mm
w1=1.76 mm
w2=3.18 mm
α=6.5 deg.
tan(2α)=0.23

When the conditional expression (1) is satisfied, the optical scanning apparatus can have a reduced thickness and a light beam passing through the first transmitting surface S1 (R1 surface) of the imaging lens 11 and that passing through the fourth transmitting surface S3 (R4 surface) can be separated in the sub-scanning section.

Thus, the high-resolution optical scanning system can be achieved.

To reduce the thickness of the optical scanning apparatus, it is useful that the tilt angle α of the planar reflector 7 be equal to or smaller than 20°.

If the tilt angle α of the planar reflector 7 exceeds 20°, a reduction in the thickness of the optical scanning apparatus is difficult, the size of the imaging lens 11 is increased, and this results in an increase in cost.

If the tilt angle α of the planar reflector 7 is at or below 2° (deg.), a light beam in the first transmitting surface (S1 surface) and that in the fourth transmitting surface (S3 surface) overlap each other, which reduces resolution.

Figure 12A:
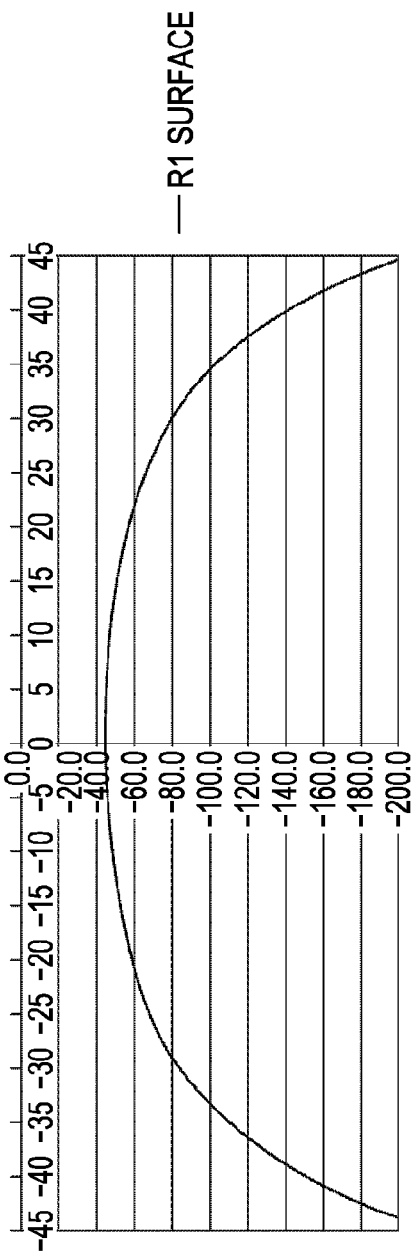
FIGS. 12A and 12B illustrate changes in sagittal line R according to the second embodiment.
Figure 12B:
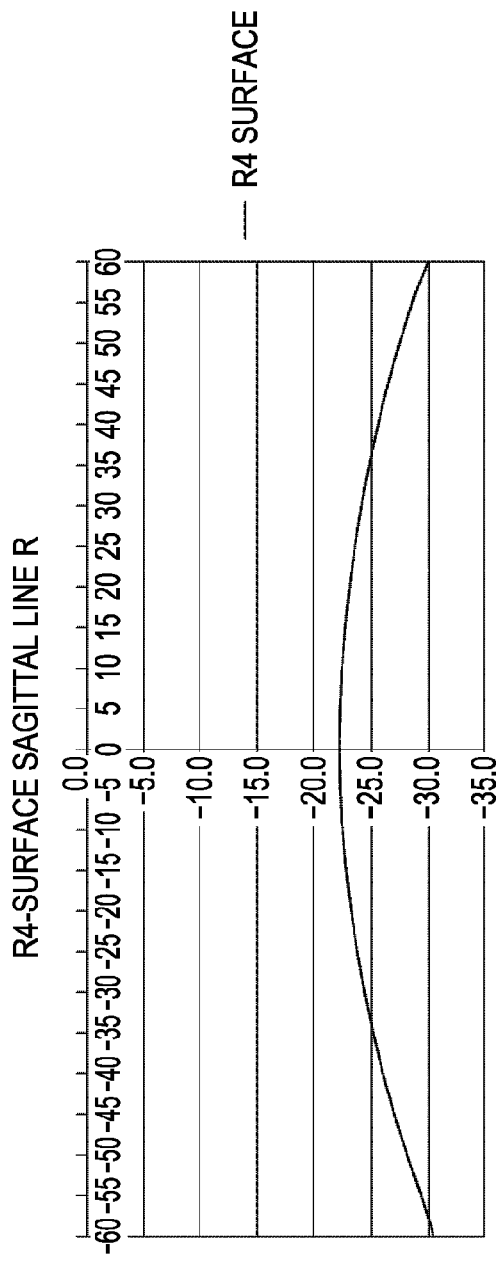

In the present embodiment, as illustrated in Table 3 and FIGS. 12A and 12B, the radius of curvature of the first transmitting surface (S1 surface) in the sub-scanning direction and that of the fourth transmitting surface (S3 surface) change in the main scanning direction (Y direction).

Figure 13A:
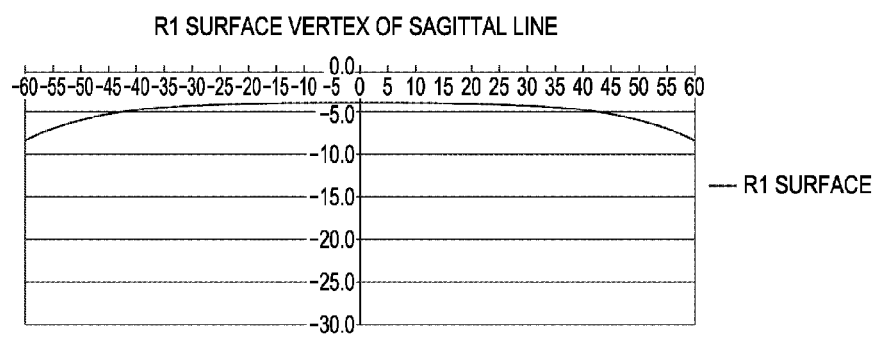
FIGS. 13A and 13B illustrate changes in surface vertex of a sagittal line of the imaging lens according to the second embodiment.
Figure 13B:
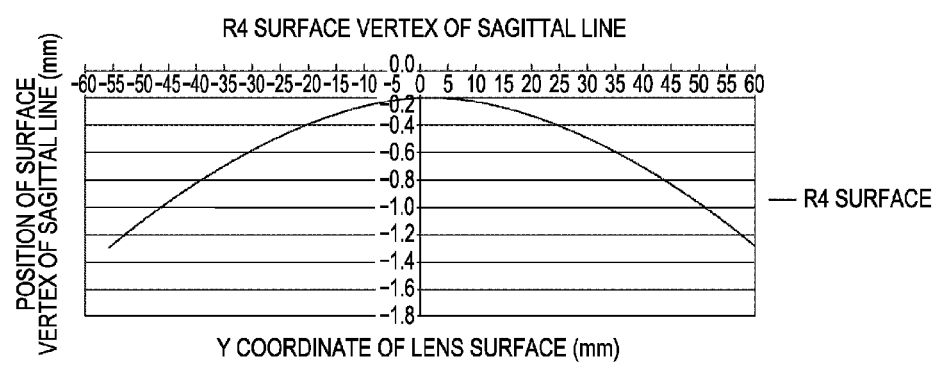

As illustrated in Table 3 and FIGS. 13A and 13B, the vertex of the sagittal line changes in the Y direction. Thus, the amount δ of the step has different values in the Y direction.

Figure 14:
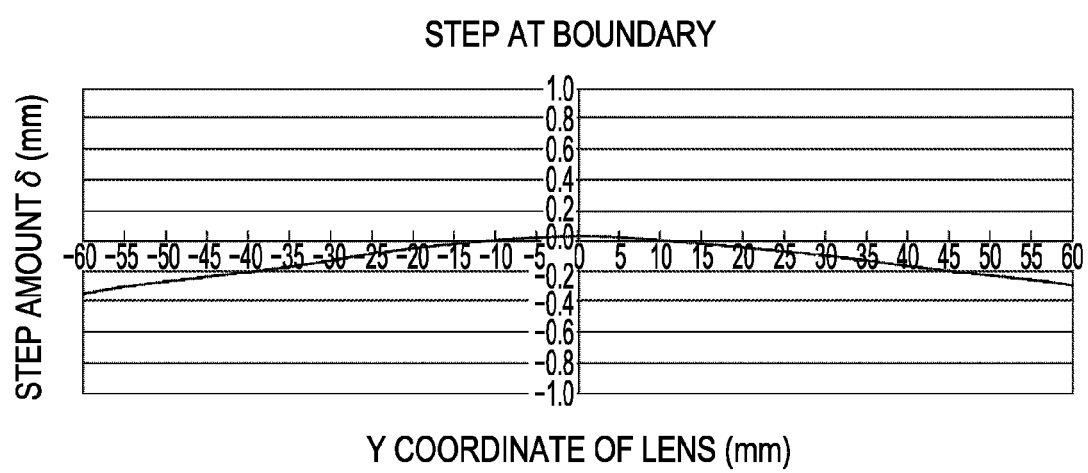
FIG. 14 illustrates a change in amount of a step of the imaging lens according to the second embodiment.

FIG. 14 illustrates a relationship between the amount δ of the step and Y according to the present embodiment.

In the present embodiment, the first transmitting surface S1 (R1 surface) and the fourth transmitting surface S3 (R4 surface) have different thicknesses such that the absolute value of the amount δ of the step is small, and the thicknesses are determined such that the amount δ of the step satisfies |δ|=0 at least one location in the lens effective area.

In the present embodiment, a point at which the absolute value of the amount of the step |δ|=0 is satisfied is present in the vicinity of the on axis.

The amount δ of the step within the lens effective area of the imaging lens 11 is set so as to be substantially negative over the entire lens effective area, and the fourth transmitting surface S3 (R4 surface) always projects toward the deflecting surface of the optical deflector.

This aims to suppress degradation in the surface shape in forming a plastic lens.

With such a configuration, the optical performance does not degrade when a light beam passes in the vicinity of the step adjacent to the first transmitting surface S1 (R1 surface)

and the fourth transmitting surface S3 (R4 surface), and the optical scanning apparatus can have a further reduced thickness.

The amount δ of the step (mm) adjacent to the first transmitting surface S1 (R1 surface) and the fourth transmitting surface S3 (R4 surface) satisfies the following conditional expression.

$$(L2/2) \times \tan(2\alpha) - (w1+w2)/4 > |\delta|, 0.66 > |\delta| \qquad (3)$$

When the amount of the step is determined so as to satisfy the conditional expression (3), the adverse effect of a surface defective (tendency) occurring in the vicinity of the step in forming a plastic lens is avoidable and the adverse effect of an error of the position where a light beam passes through the lens resulting from an error of arrangement of the imaging lens is also avoidable.

In the second embodiment, the amount of the step within the lens effective area is controlled by the lens having different lens thicknesses. However, a way to control the amount δ of the step is not limited to having different thicknesses.

If a light beam incident on the deflecting surface of the optical deflector from the incidence optical system 2, 3, and 4 converges in the main-scanning section, misregistration of printing in the main scanning direction (convergence jitter) occurs on the photo-conductive surface 12, depending on variations in decentering of the deflecting surface of the optical deflector 6.

The variations in decentering of the deflecting surface of the optical deflector 6 indicate variations in the distance from the rotation shaft of the polygonal mirror to each deflecting surface.

In the present embodiment, the polygonal mirror (optical deflector) 6 having six surfaces is used. Thus, the distance from the rotation shaft of the polygonal mirror (rotating in the direction of the arrow A) to each of the six deflecting surfaces varies, depending on manufacturing errors.

The misregistration of printing in the main scanning direction (convergence jitter) on the photo-conductive surface 12 indicates that the position of an image formed by a light beam on the photo-conductive surface 12 in the main scanning direction deviates from a designed value.

If there are variations in decentering of the deflecting surface of the optical deflector 6, when a converging light beam enters the imaging lens 11 in the main-scanning section, a convergence jitter, which does not occur when a parallel light beam enters the imaging lens 11, occurs on the photo-conductive surface 12.

If there are variations in decentering of the deflecting surface of the polygonal mirror (optical deflector) 6, because a deflecting reflective point at which a light beam incident on the deflecting surface is reflected deviates in the direction of the optical axis for each deflecting surface of the polygonal mirror (optical deflector) 6, the distance between the deflecting reflective point of the light beam deflected and reflected and the first transmitting surface S1 (R1 surface) varies according to each deflecting surface.

In this case, in the main-scanning section, the position of a light beam entering the imaging lens 11 in the main scanning direction varies, so a convergence jitter occurs on the photo-conductive surface 12.

In the present embodiment, the incidence optical system makes a light beam weakly converge. In the main-scanning section, a natural convergence point is 1450 mm from the deflecting surface, and the degree of convergence is weak.

Accordingly, the convergence jitter for an amount of decentering of the deflecting surface 6a of 20 μm is no more than 1 μm, and it is not necessary to use a polygonal mirror serving as an expensive deflecting unit having a small amount of decentering.

As described above, in the present embodiment, by satisfying the conditional expression (1) without causing a light beam to be obliquely incident on the deflecting surface 6a of the optical deflector 6 in the sub-scanning section, the following advantages are obtainable.

That is, the advantages are that the optical scanning apparatus can have a reduced thickness, a light beam passing through the first transmitting surface (S1 surface) of the imaging lens 11 and a light beam passing through the fourth transmitting surface (S3 surface) can be separated in the sub-scanning section, and the high-resolution optical scanning apparatus can be achieved.

Figure 15:
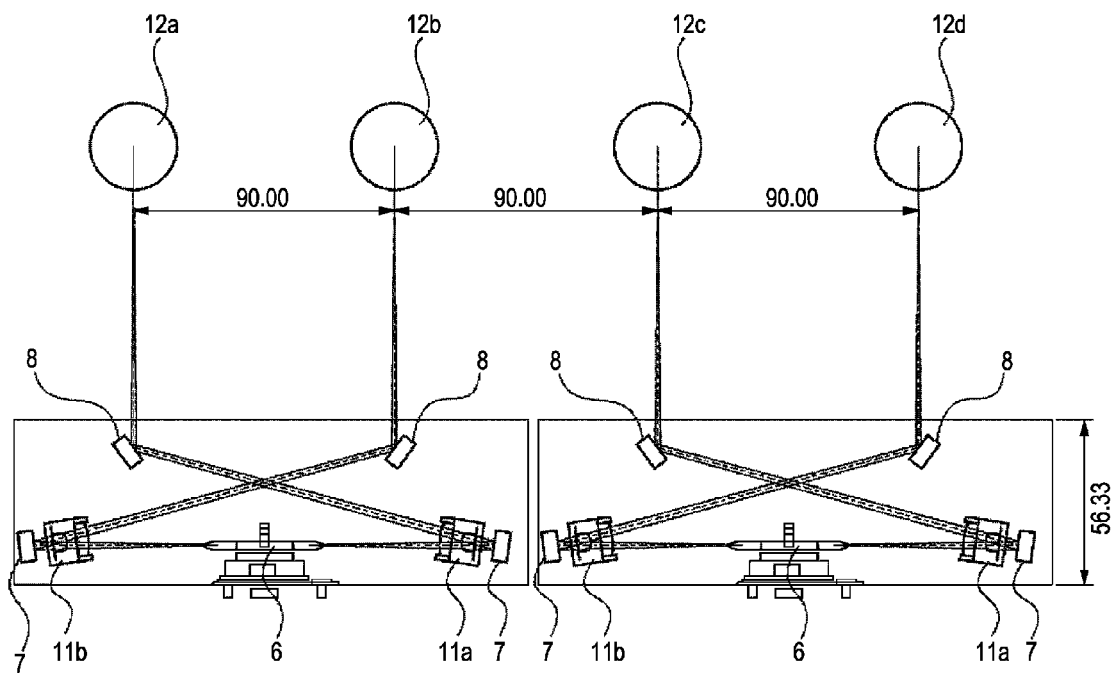
FIG. 15 illustrates a sub-scanning section according to a third embodiment of the present invention.

A third embodiment of the present invention is described next which differs from the second embodiment in that imaging lenses (imaging optical systems) 11a and 11b are disposed adjacent to the opposite sides of the optical deflector 6, as illustrated in FIG. 15.

The optical scanning apparatus according to the present embodiment includes the common optical deflector 6, the imaging lenses (imaging optical systems) 11a and 11b disposed adjacent to the opposite sides of the optical deflector 6, planar reflectors 8 disposed adjacent to the opposite sides of the optical deflector 6, and the planar reflectors 7, and an incidence optical system (not shown) disposed adjacent to the opposite sides of the optical deflector 6.

FIG. 15 illustrates a color image forming apparatus that includes two optical scanning apparatuses each having two photo conductors.

The present embodiment differs from the first embodiment in that a plurality of surfaces to be scanned 12a and 12b (or 12c and 12d) in each of the optical scanning apparatuses is scanned by a light beam subjected to scanning and deflected by different deflecting surfaces of the common optical deflector 6.

The other respects, the configuration of the present embodiment is substantially the same as in the first embodiment.

The coordinate system and the aspheric expression according to the third embodiment are also the same as in the first embodiment.

In the third embodiment, the same reference numerals are used in the same elements as in the first embodiment.

FIG. 15 illustrates a sub-scanning section according to the third embodiment.

In each optical scanning apparatus, the radius of curvature of each of the imaging lenses 11a and 11b in the sub-scanning direction varies asymmetrically with respect to the main scanning direction (Y direction). Thus, the imaging lenses 11a and 11b are different lenses.

Light beams after passing through the imaging lenses 11a and 11b included in each optical scanning apparatus cross above the optical deflector 6 and are guided by the planar reflectors 8 to the photo conductors (photosensitive drums) 12a, 12b, 12c, and 12d as the surfaces to be scanned.

Such an arrangement achieves miniaturization of each of the optical scanning apparatuses.

Figure 16:
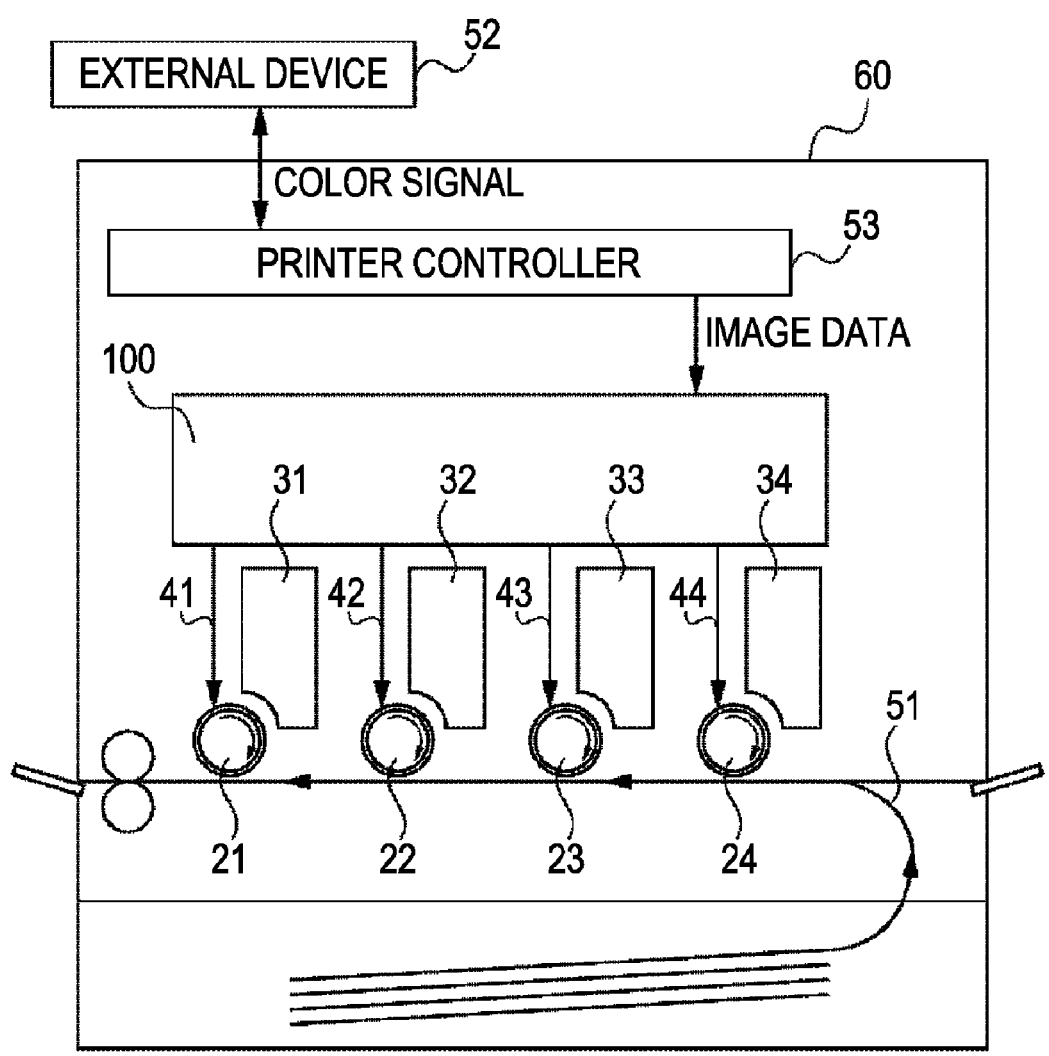
FIG. 16 illustrates an image forming apparatus according to an embodiment of the present invention.

FIG. 16 illustrates a sub-scanning section of an image forming apparatus according to another embodiment of the present invention.

In FIG. 16, a color image forming apparatus 60 includes an optical scanning apparatus 100 according to any one of the optical scanning apparatuses described in the first to third embodiments.

The color image forming apparatus 60 further includes photo conductors (photosensitive drums) 21, 22, 23, and 24 serving as an image bearing member.

The color image forming apparatus 60 further includes developing units 31, 32, 33, and 34 developing an electrostatic latent image formed on the respective photosensitive drums and a conveying belt 51.

In FIG. 16, the color image forming apparatus 60 receives color signals of red (R), green (G), and blue (B) from an external device 52, such as a personal computer.

These color signals are converted by a printer controller 53 in the color image forming apparatus 60 into image data (dot data) elements of cyan (C), magenta (M), yellow (Y), and black (B).

These image data elements are input to the optical scanning apparatus 100.

The optical scanning apparatus 100 emits light beams 41, 42, 43, and 44 modulated according to the image data elements. The photosensitive surfaces of the photosensitive drums 21, 22, 23, and 24 are scanned in the main scanning direction by the light beams 41, 42, 43, and 44.

The color image forming apparatus according to the present embodiment emits light beams corresponding to colors of cyan, magenta, yellow, and black from the single optical scanning apparatus 100, records an image signal (image information) on the photosensitive drums 21, 22, 23, and 24, and prints a color image at a high speed.

The color image forming apparatus according to the present embodiment forms electrostatic latent images for the corresponding colors on the respective photosensitive drums 21, 22, 23, and 24 using light beams based on image data elements by using the single optical scanning apparatus 100, as described above.

After that, the color image forming apparatus transfers multiple images to a recording material using a transferring unit configured to transfer a toner image to a receiver material and thus forms a single full-color image.

One example of the external device 52 may be a color image reading apparatus that includes a charge-coupled device (CCD) sensor.

In this case, the color image reading apparatus and the color image forming apparatus 60 constitute a digital color copier.

An electrophotographic process according to an embodiment of the present invention is described next.

As previously described, a light beam emitted from a light emitting unit is modulated on the basis of image data, and radiating the surface of a photosensitive drum with the light beam forms an electrostatic latent image thereon.

The electrostatic latent image is developed as a toner image at the position further downstream of the location of the radiation with the light beam in the direction of rotation of the photosensitive drum by a developing unit disposed so as to be in contact with the photosensitive drum.

The toner image developed by the developing unit is transferred to a sheet being a receiver material below the photosensitive drum by a transfer roller disposed so as to face the photosensitive drum.

The sheet is held in a paper tray disposed forward of the photosensitive drum. The sheet can also be manually fed.

A paper feed roller is disposed at the end of the paper tray and is used to supply a sheet in the paper tray to a conveying path.

In such a way, the sheet with an unfixed toner image being transferred thereto is further conveyed to a fixing unit disposed rearward of the photosensitive drum.

The fixing unit includes a fixing roller having an inside fixing heater and a pressure roller disposed so as to press against the fixing roller. The fixing unit presses and heats a sheet conveyed from the transfer portion using the pressing portion of the fixing roller and the pressure roller, thereby fixing an unfixed toner image on the sheet.

An eject roller is disposed rearward of the fixing roller and ejects the sheet with the fixed image to the outside of the image forming apparatus.

The printer controller 53 not only converts data, as previously described, but also controls each unit in the image forming apparatus, such as a motor of a polygonal mirror in the optical scanning apparatus.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-115731 filed Apr. 25, 2008, which is hereby incorporated by reference herein in its entirety.

What is claimed is:

1. An optical scanning apparatus comprising:
a light emitting unit;
a deflecting unit having a deflecting surface;
an incidence optical system configured to cause a light beam emitted from the light emitting unit incident on the deflecting unit;
an imaging optical system including a transmissive imaging optical element that forms an image of a light beam on a surface to be scanned, the light beam being subjected to scanning and deflected by the deflecting surface of the deflecting unit, with the transmissive imaging optical element having a first transmitting surface, a second transmitting surface, a third transmitting surface, and a fourth transmitting surface; and
a reflective optical element disposed in an optical path between the deflecting unit and the transmissive imaging optical element, the reflective optical element having a reflecting surface,
wherein, after the light beam subjected to scanning and deflected by the deflecting surface of the deflecting unit passes through the transmissive imaging optical element in order of the first transmitting surface and the second transmitting surface and then reflected at the reflecting surface of the reflective optical element, the light beam re-passes through the transmissive imaging optical element in order of the third transmitting surface and the fourth transmitting surface, and
wherein the following condition is satisfied:

$$L2 \times \tan(2\alpha) > (w1+w2)/2$$

$$0 < \alpha < 20$$

where $L2$ is a length in millimeters of an optical path from the first transmitting surface to the reflecting surface, $\alpha$ is an angle in degrees between a normal to the reflecting surface and a normal to the deflecting surface in a sub-scanning section, $w1$ is a width in millimeters of the light beam in a sub-scanning direction at the first transmitting surface, and $w2$ is a width in millimeters of the light beam in the sub-scanning direction at the fourth transmitting surface.

2. The optical scanning apparatus according to claim 1, wherein the reflecting surface of the reflective optical element has zero power in the sub-scanning direction.

3. The optical scanning apparatus according to claim 1, wherein the first transmitting surface has a negative power in the sub-scanning direction, and the fourth transmitting surface has a positive power in the sub-scanning direction.

4. The optical scanning apparatus according to claim 1, wherein, when the light beam incident on the deflecting surface of the deflecting unit is projected in the sub-scanning section containing an optical axis of the first transmitting surface, an angle between the light beam incident on the deflecting surface and the optical axis of the first transmitting surface is zero.

5. The optical scanning apparatus according to claim 1, wherein each of the second transmitting surface and the third transmitting surface has zero power in the sub-scanning direction.

6. The optical scanning apparatus according to claim 1, wherein the first transmitting surface and the fourth transmitting surface have a step in a direction of the normal to the reflecting surface of the reflective optical element in the sub-scanning section, and the following condition is satisfied in an effective area of the transmissive imaging optical element:

$$(L2/2) \times \tan(2\alpha) - (w1+w2)/4 > |\delta|$$

where $\delta$ is an amount of the step in millimeters.

7. The optical scanning apparatus according to claim 6, wherein the amount $\delta$ of the step varies along a main scanning direction, and a region where $|\delta|=0$ is satisfied is present in the effective area of the transmissive imaging optical element.

8. An image forming apparatus comprising:
   an optical scanning apparatus according to claim 1;
   a photosensitive drum disposed at the surface to be scanned;
   a developing unit configured to develop an electrostatic latent image as a toner image, the electrostatic latent image being formed on the photosensitive drum scanned by a light beam from the optical scanning apparatus;
   a transferring unit configured to transfer the toner image to a receiver material; and
   a fixing unit configured to fix the transferred toner image on the receiver material.

9. An image forming apparatus comprising:
   an optical scanning apparatus according to claim 1; and
   a printer controller configured to convert image data received from an external device into an image signal and to input the image signal into the optical scanning apparatus.

* * * * *